May 24, 1966 J. Z. JACOBY 3,253,259

PLURAL CHANNEL DATA TRANSMISSION SYSTEM HAVING MEANS
FOR UTILIZING ONLY THE OPERATIVE CHANNELS

Filed Sept. 19, 1961 9 Sheets-Sheet 1

INVENTOR
J. Z. JACOBY
BY
S E Hollander
ATTORNEY

INVENTOR
J. Z. JACOBY
BY S E Hollander
ATTORNEY

May 24, 1966 J. Z. JACOBY 3,253,259

PLURAL CHANNEL DATA TRANSMISSION SYSTEM HAVING MEANS FOR UTILIZING ONLY THE OPERATIVE CHANNELS

Filed Sept. 19, 1961 9 Sheets-Sheet 3

INVENTOR
J. Z. JACOBY
BY
SE Hollander
ATTORNEY

INVENTOR
J. Z. JACOBY
BY
S E Hollander
ATTORNEY

INVENTOR
J. Z. JACOBY
BY
SE Hollander
ATTORNEY

INVENTOR
J. Z. JACOBY
BY
S E Hollander
ATTORNEY

May 24, 1966 J. Z. JACOBY 3,253,259

PLURAL CHANNEL DATA TRANSMISSION SYSTEM HAVING MEANS FOR UTILIZING ONLY THE OPERATIVE CHANNELS

Filed Sept. 19, 1961 9 Sheets-Sheet 7

INVENTOR
J. Z. JACOBY
BY S E Hollander
ATTORNEY

INVENTOR
J. Z. JACOBY
BY S E Hollander
ATTORNEY

INVENTOR
J. Z. JACOBY
BY
S E Hollander
ATTORNEY

United States Patent Office 3,253,259

Patented May 24, 1966

3,253,259

PLURAL CHANNEL DATA TRANSMISSION SYSTEM HAVING MEANS FOR UTILIZING ONLY THE OPERATIVE CHANNELS

John Z. Jacoby, Murray Hill, N.J., assignor to Bell Telephone Laboratories, Incorporated, New York, N.Y., a corporation of New York Filed Sept. 19, 1961, Ser. No. 139,174
20 Claims. (Cl. 340—147)

This invention relates to data transmission systems and more particularly to multichannel data transmission systems having more than one mode of operation.

Data transmission systems have found increasingly widespread employment in recent years. These systems are utilized in connection with various types of information handling circuits. Almost all data transmission systems comprise five basic elements. The first of these is the transmitter which orders the information to be sent in a recognizable pattern, most often a series of binary valued electrical pulses. These pulses quite often modulate a carrier signal. The second basic element in the data transmission system is the modulator which transforms the binary valued information pulses into more advantageous signals for transmission purposes. The information is then transmitted along the data channel, the third link in the system. A demodulator at the receiving end demodulates the transmitted signal and converts it into the same series of pulses that was priorly obtained at the transmitter output. The fifth element, the receiver, directs the information pulses to whichever peripheral equipment has need of them, and in addition often converts the electrical data into other forms such as the magnetization state of a magnetic core, the operation of a relay, etc.

In many data transmission systems, the data is transmitted in serial form. One piece of information follows another. Often a single piece of information or "word" may comprise a series of pulses, for example, twenty. The particular word is determined by the particular one of the two binary values of each of the twenty pulses. The first twenty pulses represent a first word, the second twenty another, etc. Very often, however, more than one channel is employed. If the transmitting and modulating equipment transmits the modulated carrier over two channels, each channel may carry half or ten of the twenty bits in each word. Thus, the first and eleventh pulses might be transmitted simultaneously along different ones of the two channels, followed by the second and twelfth pulses, etc. The receiving equipment orders the received pulses in the correct manner so that the correct sequence of digits comprising the entire word is obtained. This popular type of data transmission system operates in a serial-parallel mode. Information is sent in parallel, that is, along many channels simultaneously. The form of transmission in each channel is serial with one pulse succeeding another.

In these serial-parallel data transmission systems each of the transmitted part-words often contains a parity check. One of the simplest and most popular parity checks is the type wherein an additional bit is provided for each set of transmitted data. This bit is made a "zero" or "one" by the transmitting equipment so that the total number of "ones" is made odd or even or the total number of "zeros" is made odd or even in accordance with a predetermined design. At the receiving end the total number of "ones" or "zeros" is checked to determine if it has the proper weight. If it does not, an error most probably has been made in the transmission. Such errors can arise from malfunctions in any one of the five elements identified above.

In serial-parallel transmission systems where a part of each word is transmitted along a different channel, a parity check may be provided for the entire word as a whole or for each part of the word itself. Although this latter technique reduces the capacity of the channels as a number of bits equal to the number of channels must now be parity instead of information bits, rather than a single bit for the entire word, it is advantageous in that the malfunction may be isolated to a particular one of the many channels used. If the parity check for a particular channel reveals successive errors, it is most desirable that that particular channel be repaired or replaced.

In general, prior art serial-parallel transmission systems have been inefficient in one respect, especially where the probability is high of one of the channels becoming inoperative and thus requiring correction or replacement. Until the repair is accomplished, that part of the word normally transmitted over the inoperative channel is lost. The remaining channels carry the other parts of the word but the entire word can no longer be received. Quite often the operation of the complete system must be halted until the necessary repairs and modifications are made because only part of an information word is ofttimes useless. This is very inefficient for not only is the entire transmission process disrupted because of a break in only one of the channels, but in data transmission systems which must be continuously ready to operate, such as those used in defense applications, precautions must be taken to avoid the possibility of a complete breakdown in the channels employed. This often results in more expensive equipment and even in the duplication of various blocks of equipment.

It is an object of this invention to provide a data transmission system having a plurality of channels wherein upon the occurrence of a predetermined malfunction in one of the channels, the other channels carry not only their own information but the information normally transmitted along the inoperative channel as well.

For example, in a two-channel system the transmitting equipment often pulses out the information into a separate modulator preceding each of the channels. The transmitter might comprise two shift registers in each of which one-half of an information word is stored. Each of these registers shifts out the binary information into one of the two modulators. In the event that one channel becomes inoperative, at first only the shift register connected to the functioning channel operates. Immediately thereafter, the other shift register outpulses its information into the same operative channel. At the receiving end the two serial half-words are directed to the two respective receiving circuits that normally handle them. It is seen that in a simple two-channel system, one channel becoming inoperative merely reduces the capacity of the entire system by a factor of two rather than completely disrupting its operation. In more complex data transmission systems having a greater number of channels and, therefore, a greater probability of one or more channels becoming inoperative, it is apparent that the application of the principles of this invention allow continuous operation rather than the sporadic one which would be obtained were the system put out of commission each time one of the channels malfunctioned.

To provide a fully automatic data transmission system of the type described it is necessary that the receiving equipment detect the malfunction and automatically modify both itself and the transmitting equipment for the lower capacity transmission. Errors are randomly but often received in almost all data transmission systems, these errors arising from temporary malfunctions in one of the five basic elements or from external conditions. Therefore, it is not desirable that the transmitting equipment operate into a reduced number of modulators and the receiving equipment operate from a reduced number of demodulators in response to only a single received error. A single error is not necessarily conclusive that the channel over which it is received or the associated modulating or demodulating equipment is malfunctioning. It is a sequence of errors received in a predetermined time interval that best indicates that one channel is operating improperly. It is only after this sequence of errors of a determinative nature is received that the circuit should modify itself for the second type or second mode of operation.

It is another object of this invention that operative channels in a data transmission system handle the information normally transmitted along an inoperative channel automatically but only in response to a predetermined sequence of errors having been transmitted.

Channel malfunctions are determined by the parity check circuits in the receiving equipment. Responsive to these circuits, the receiving equipment may automatically modify itself for the second mode of operation. However, means must be provided for automatically modifying the transmitting equipment as well. If the data transmission is one-way only, data being transmitted only from the transmitter to the receiver and not in the reverse direction as well, additional means must be provided for transmitting a signal from the receiver to the transmitter for modifying the operation of the latter.

Many data transmission systems, however, operate in both directions. A first transmitter at one end transmits information along a first plurality of channels to a first receiver at the second end. Similarly, a second transmitter at the second end transmits information along a second plurality of channels to a second receiver at the first end. The information transmitted in either direction may have no relationship with the information in the other, or may instead be determined by it if received information is operated upon, for example, by computer equipment which determines the information to be transmitted back. In a two-direction serial-parallel data transmission system, a most advantageous method of modifying a first transmitter associated with a first plurality of channels in response to the receiving of a predetermined error sequence by the associated first receiver would be to control the second transmitter at the same end as the first receiver to transmit a coded signal along the second plurality of channels to the second receiver at the end with the first transmitter to be modified. The transmitter and receiver at each end might be so connected that the reception of a coded signal by the receiving equipment modifies the transmitter at the same end.

It is another object of this invention to provide a two-direction data transmission system wherein a coded signal indicative of the malfunction of a channel in one direction is transmitted along the channels in the other direction for automatically modifying the transmitter associated with the inoperative channel in the first direction.

In the illustrative embodiment of the invention a two-way data transmission system is used for transmitting data concerning the energization states of a set of relays. A plurality of relays are arranged in rows and columns at a first site. Each column of relays represents a different "word." It is necessary in many applications, such as telephone systems, to energize a plurality of relays at a second site in a manner identical to those at the first site. Any changes in the relays at the first location should be transmitted to the second location whereupon the states of the second set of relays may be changed accordingly. Similarly, any changes originating in the relays at the second location should be transmitted to the first location to change the associated relays accordingly. In this manner both sets of relays at the two locations will have identical energization states. In satellite telephone systems, for example, the changes in the relays at the first location may be effected by the central office equipment, while the changes in the second set of relays at a remote location may be effected by subscriber action. For the central office and remote equipment to function properly with each other, it is necessary that each be notified of changes in the relay memory of the other. A first transmitter transmits changes in the relay patterns in one location via a two-channel data transmission path in one direction to a receiver at a second location which then energizes the second set of relays in the appropriate manner. A second transmitter transmits changes in this latter set of relays, these changes originating from action at the second location, along a second two-channel data transmission path in the other direction to a second receiver located at the first location and the first set of relays are energized accordingly.

All "words" of relay states are scanned successively at each end. Each transmitter transmits data representing the bit information in the word scanned only if the information content of that word has changed since the prior scan. Along with the word information transmitted, the address of the particular word being scanned in the array is sent as well in order that the associated receiver identify which set of relays is to be acted upon. In the illustrative embodiment, in each direction one-half of each word and one-half of its address is transmitted along one channel. The other half of the word and the other half of the address are transmitted along the second channel. The receiving equipment connected to both channels recombines the information and acts upon the approprite set of relays in accordance with the data transmitted. Transmitting and receiving equipment, as well as transmission media, are provided for both directions.

The data transmitted along each channel, consisting of both relay state information and address information, is provided with a parity check. An extra bit is transmitted with each half-word or data in each channel. This bit is made either a "zero" or "one" in such a manner that the total number of "ones" transmitted is odd. A parity check circuit in the receiving equipment checks the weight of the number of "ones" transmitted along each channel. In the event that an even number of "ones" is transmitted along one of the channels in a first direction, an error has been made. This does not necessarily imply that the channel along which the erroneous information was transmitted has become inoperative. To determine whether or not the channel is indeed faulty, a signal is sent via the other direction to the transmitter which has sent the erroneous information. This signal notifies that transmitter to scan the entire array of relays and transmit information concerning the energization states of these relays whether or not these states have changed subsequent to the previous scan. If another error is detected by the same receiving equipment during this complete scan of the relays, it is highly probable that the channel via which both errors were transmitted has become inoperative.

In such an event the transmitting and receiving equipment in the first direction must be modified for transmission only along the other operative channel. The receiving equipment in this first direction easily modifies itself for this second mode of operation in response to the error determination of that receiver. In order to notify the associated transmitter in the same direction that it must modify itself for the second type of operation, the receiver which has detected the error in the first direction operates a special relay in the relay array at its end. The transmission equipment in the second direction naturally transmits information concerning this change in relay state to that end of the system where the error originated. The equivalent relay at this end is therefore energized. And this relay, upon its energization, automatically modifies the transmitting circuit at the end where the erroneous information originated for the second mode of operation. Thus the detection of a predetermined sequence of errors transmitted in one direction and detected by the associated receiver automatically modifies both the transmitting and receiving equipment associated with that direction. Each of the two sets of relays contains four special relays, each pair of these relays being operative in response to the inoperativeness of a particular one of the four channels, there being two channels in each of the two directions. Each of the two sets of relays similarly contains another two special relays, each pair of these relays being operated when a rescan is desired of a respective one of the two arrays.

After an error is received, the entire array is scanned and the entire array of data is transmitted. The word in which the error occurred is not the only word transmitted nor are words unchanged since the last previous scan omitted, as in normal transmission. The reason for not repeating only the erroneous word is that it is possible for the error to have occurred in the address bits and consequently the receiver cannot, with absolute certainty, notify the transmitter which particular word to retransmit. The purpose of sending even unchanged words is to insure that the receiver array is brought up to date. If one error has occurred maybe another has as well, and if this error was not detected, for example, because two bits were wrong and the total number of "ones" was still odd in number, it is necessary now to take the appropriate relay action in the receiving array to make the information content of both arrays identical.

In the second mode of operation wherein only one channel is utilized in the direction in which the error has occurred, the half-word of relay and address information normally transmitted over this channel is sent in the usual manner. The other half-word is not, however, transmitted along the inoperative channel. Immediately after the transmission of the first half-word along the operative channel, the second half-word is transmitted along the same channel. The modified transmitting equipment rather than outpulsing the two half-words in parallel along the two associated channels transmits them in series along the same operative channel. The modified receiving equipment in turn acts upon the associated relay equipment in response to the reception of two serial half-words along the same channel.

Thus, in contradistinction to many prior art data transmission systems, the malfunctioning of one channel does not necessitate the complete inhibition of transmission in the associated direction while that channel is being repaired. Instead, all information in that direction is transmitted along the remaining operative channels, in the illustrative embodiment, the remaining one channel. It is seen that in the illustrative embodiment rather than transmission being completely halted when one channel becomes inoperative, the capacity of the transmission system in that direction is merely reduced in half.

It takes twice as long for a single word to be transmitted as both half-words must now be transmitted along the same channel in succession rather than simultaneously along the two channels. But the system remains operative. This is highly advantageous. It means, for example, that those subscribers served by a satellite telephone system using the data transmission system of this invention need not be deprived of service while the inoperative channel is being repaired. Similarly, in defense applications where the inoperativeness of a key data transmission system may endanger the security of the country, a data transmission system that remains operative although one channel has become inoperative is highly advantageous.

It is a further advantage of this data transmission system that the transmitting and receiving equipments are automatically modified. There is no interruption in the data transmission.

It is realized that the system can be easily extended to applications wherein transmission in either direction utilizes more than two channels. Such systems are advantageous in that their capacity is larger but are often avoided due to the greater probability of one channel of many failing rather than one out of only two malfunctioning. In many prior art extended systems, the incidence of total failure therefore is high. The inoperativeness of one or more channels is an extended system of my invention, however, automatically results in a different mode of operation while those channels are being repaired. The probability of total failure in the extended systems of my invention is thus even smaller rather than larger as it is less probable that many channels will all fail than even the two channels utilized in the illustrative embodiment.

Another advantage of the data transmission system of this invention is that it can be utilized in an entirely different application. Where it is desired to transmit between a plurality of pairs of transmitting and receiving circuits it is often necessary to provide a separate transmission path for each pair of equipments. It is apparent, however, that in accordance with the principles of my invention a lesser plurality of channels may be used with a greater plurality of pairs of transmitting and receiving circuits. Where the relative capacity requirements of each pair changes in time, the channels may be apportioned accordingly. If one pair of equipments requires a larger capacity transmission medium, it is merely necessary to assign more than one channel to this pair. Similarly, in a relatively inactive period one pair of equipments may be disconnected from all channels. The principles of my invention may be used to provide a plurality of data transmission channels that are easily switched between a plurality of pairs of transmitting and receiving equipments.

It is a feature of this invention to provide a plurality of channels in each direction of a two-way data transmission system.

It is another feature of this invention to detect a predetermined sequence of errors transmitted along any one of the channels in either direction.

It is another feature of this invention to provide the transmission system in each direction with two modes of operation, a normal one and another wherein transmission is attempted along only the operative channels in each direction.

It is another feature of this invention to automatically modify the receiving equipment which detects the predetermined sequence of errors along one of its channels for working in conjunction with only the other channels in the second mode of operation.

It is another feature of this invention to transmit a coded signal in the other direction for modifying the transmitting circuit associated with the inoperative channel so that it will work in conjunction with only the remaining operative channels in the associated direction.

A complete understanding of this invention and the various features thereof may be gained from consideration of the following detailed description and the accompanying drawing, in which.

Figure 1:
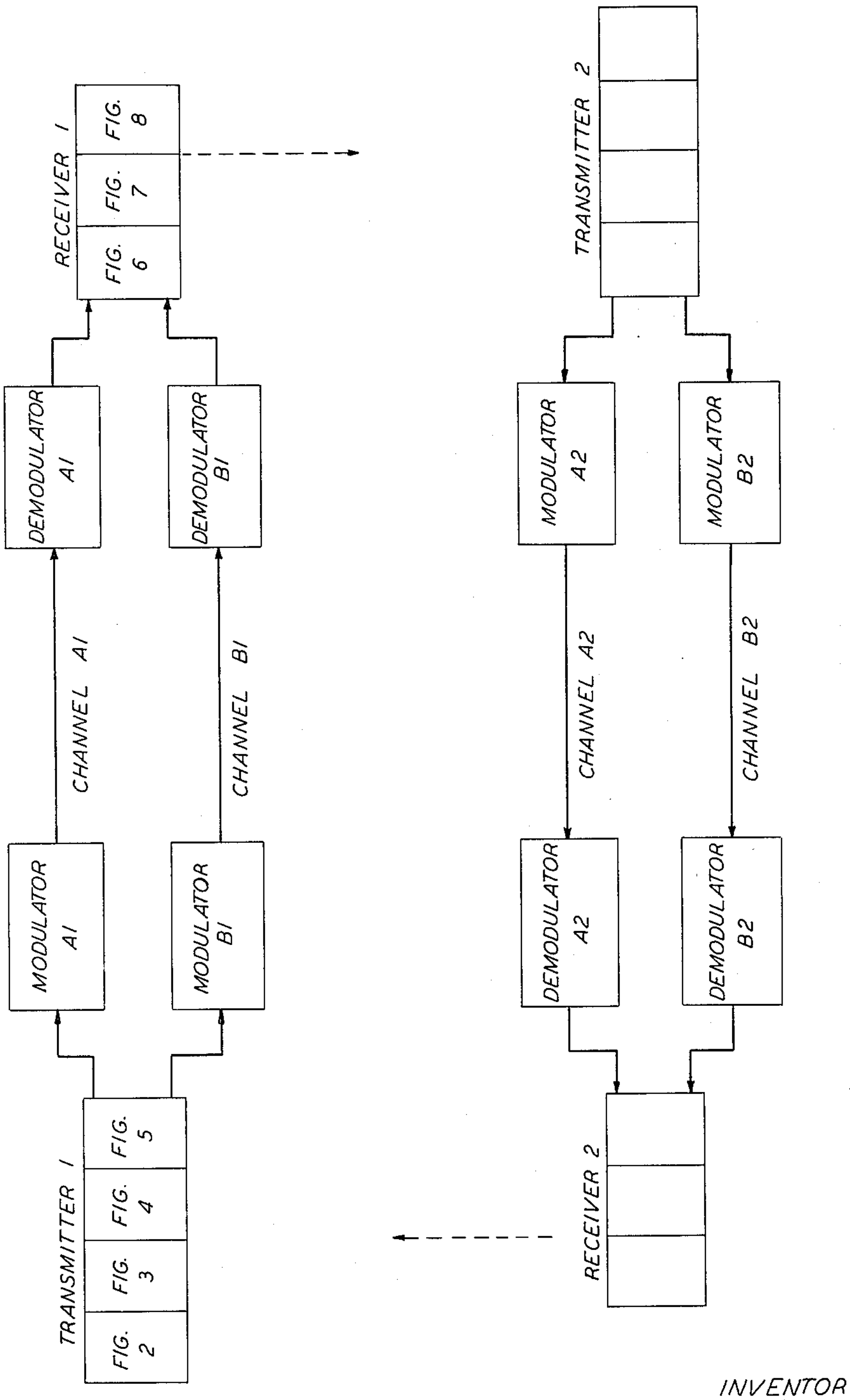
FIG. 1 depicts in block diagram form one illustrative embodiment of any invention and further shows the arrangements of FIGS. 2–5 and FIGS. 6–8.

Referring to FIG. 1, the various components of my invention are illustrated in block diagram form. Transmission and receiving circuits are provided for each direction. The equipment in the upper portion of the figure transmits information from left to right. The equipment in the lower portion of the figure transmits data from right to left. Transmitter 1 outpulses its information into channels A1 and B1 associated with the first direction. As in most transmission circuits modulators are interposed between the transmitting equipment and the channel media and demodulating circuits are interposed between the channel media and the receiving circuit. The modulating and demodulating equipment, as well as the channel media, may be any of well-known types, my invention not being limited to any particular ones of these. The modulating and demodulating equipments merely act upon series of pulses at the outputs of the transmitter and provide the same series of pulses at the inputs of the receiving circuit. The transmitting equipment in my invention is controlled to outpulse information from either both or only one of the two outputs. Likewise, the receiving equipment is adjustable to receive series of pulses from both or only one of its two inputs. The modulating and demodulating equipments are not controlled in my invention and merely act upon whatever series of pulses appear at their inputs.

An array of relays is included in each receiver. Data is transmitted in each direction so that the energization states of the relays in receiver 1 will be identical to those of receiver 2. Transmitter 1 transmits data relating to changes in the states of the relays in receiver 2 which are effected by external sources located in the vicinity of receiver 2 such as a telephone central office, etc. A change in any word in the relays of receiver 2 is transmitted by transmitter 1 along channels A1 and B1 to receiver 1. Receiver 1 changes the energization states of its appropriate relays in accordance with the information received. Similarly, changes in the relays of receiver 1, effected by external sources such as subscriber action at a remote location or even changes effected by data received from the other end, results in transmitter 2 sending appropriate data via channels A2 and B2 to receiver 2 where again the relays are operated upon so that the two sets of relays remain identical. The dotted arrows from receiver 2 to transmitter 1 and from receiver 1 to transmitter 2 merely indicate symbolically the interconnections of the circuits and will be described in detail hereinbelow.

Each transmitter provides a parity check for the information transmitted along each of the two associated channels. If a predetermined sequence of errors is transmitted along one of the two channels in one direction and detected by the associated receiver, a special relay is operated in that receiver. The transmitter at the same end automatically transmits this information to the other end and operates the equivalent relay in the receiver at the other end. This equivalent relay modifies the transmitter which sent the erroneous word to transmit only along the other channel in that direction just as the associated receiver automatically modified itself in response to the energization of its relay associated with the inoperative channel. A special relay in each of the receivers is associated with channel A1, another with B1, etc. If channel A1 becomes inoperative, the first of these four special relays in receiver 1 is energized and modifies receiver 1 for operation in the second mode. At the same time the change in the state of this relay is transmitted by transmitter 2 to receiver 2 where the equivalent first special relay is operated. The operation of this relay likewise modifies transmitter 1 to transmit along only channel B1 just as receiver 1 is now modified to receive information transmitted only along this remaining operative channel. When channel A1 is eventually repaired, either one of the first special relays in either receiver is released. This information is transmitted to the other which likewise releases and normal operation ensues.

Figure 1A:
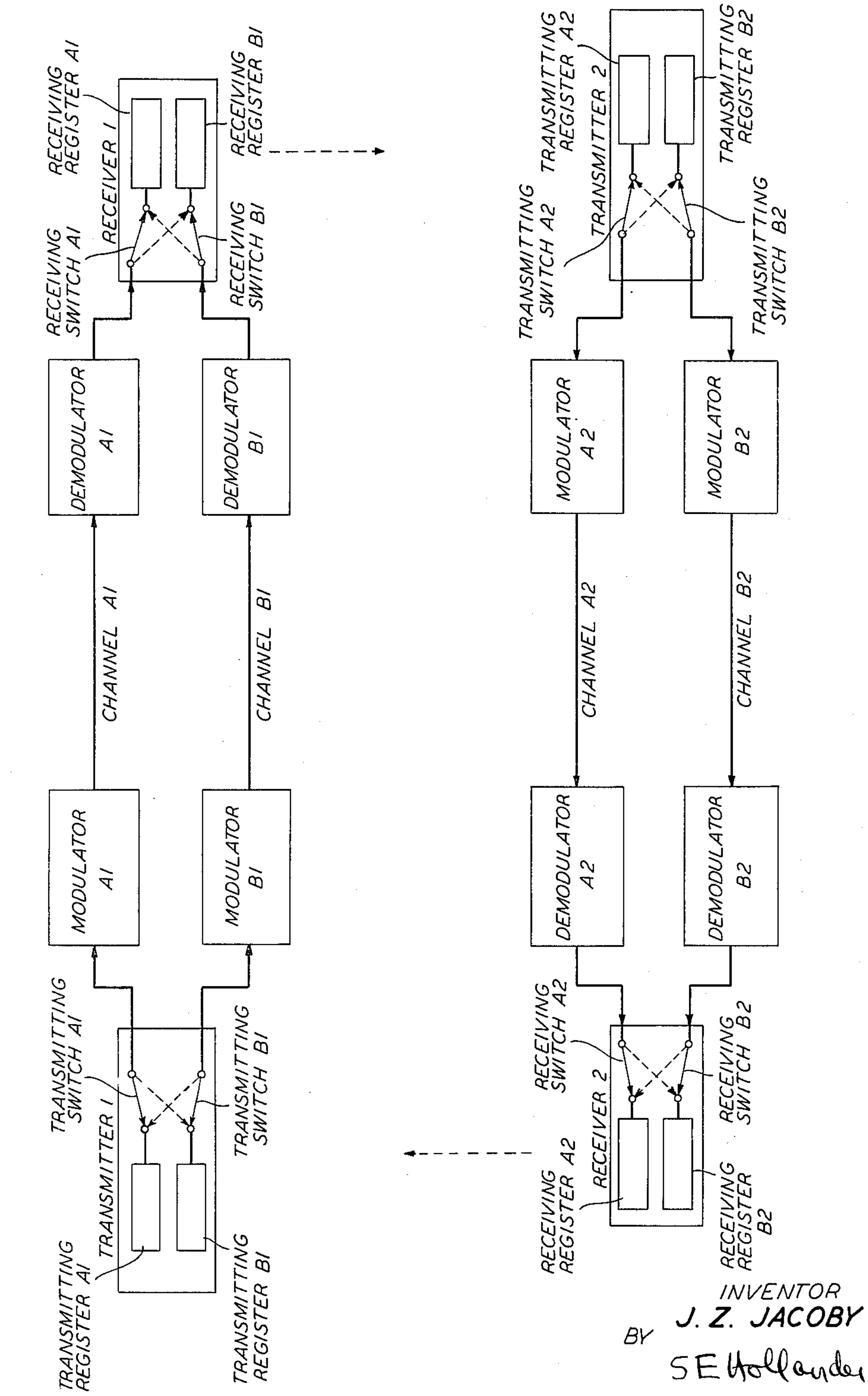
FIG. 1A depicts symbolically the operation of the embodiment of FIG. 1.
Figure 2:
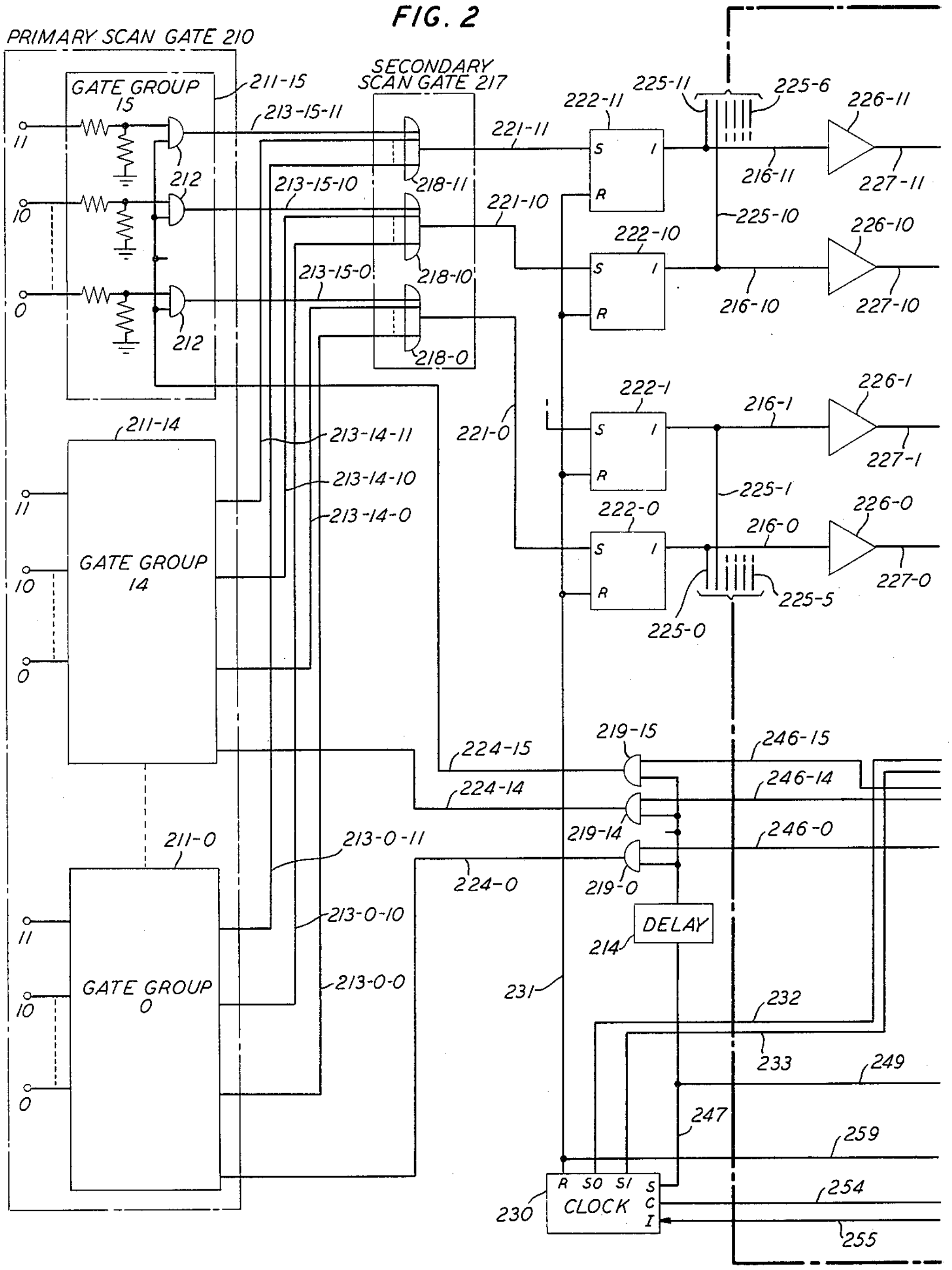
FIGS. 2–5 depict one illustrative embodiment of the transmitting circuit of my invention.
Figure 3:
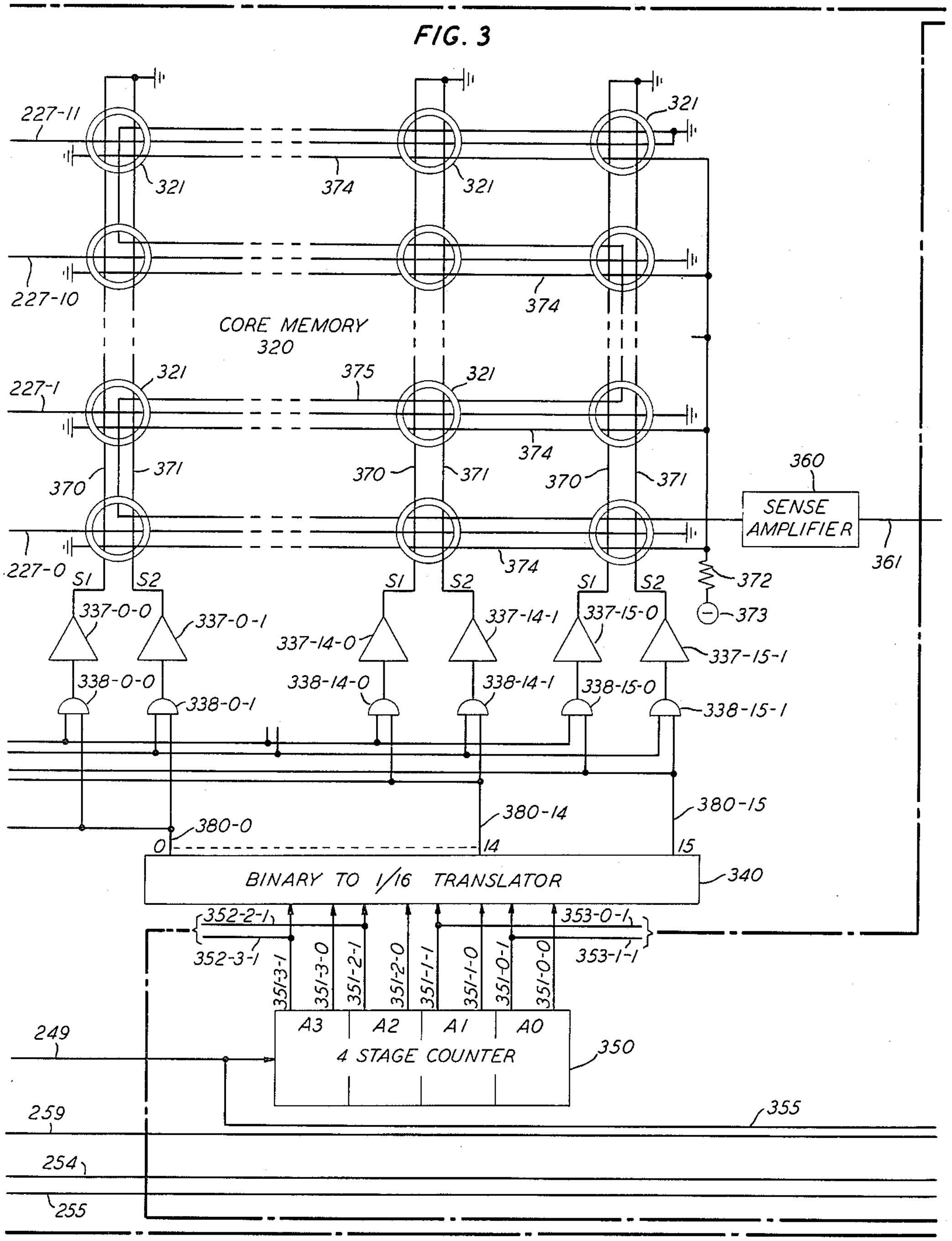

FIG. 1A is identical to FIG. 1 except that symbolic switches are shown within the two transmitters and the two receivers. When the circuit is functioning properly the switches are in the positions shown by the solid lines. Transmitting shift register A1 outpulses its information through transmitting switch A1 to modulator A1 at the same time that transmitting register B1 outpulses its information through transmitting switch B1 to modulator B1. Both receiving switches A1 and B1 are in the positions shown and the two receiving shift registers simultaneously receive the two respective half-words transmitted. Similar remarks apply to transmitter 2 and receiver 2. If channel A1 becomes inoperative, transmitting switch B1 is continuously and alternately placed between the position indicated by the solid and dotted lines. Thus, both transmitting shift registers are alternately connected (through modulator B1) to channel B1. The two shift registers outpulse their half-words alternately into the same operative channel B1. Receiving switch B1, in the second mode of operation, is likewise continuously and alternately placed in the solid and dotted line positions. After the first half-word is received, the switch moves to the dotted line position. Thus the second half-word sent along channel B1 is directed to receiving register A1. The switch then reverts to its normal position and the first half of the next word is directed as usual to receiving register B1. The switch operates after each half-word is transmitted. Similarly, if channel B1 is inoperative, transmitting and receiving switches A1 alternately connect the two transmitting and the two receiving shift registers to channel A1. If either channel in the other direction becomes inoperative, transmitting switches A2 and B2 and receiving switches A2 and B2 operate in a similar manner.

The description of the transmission system will be divided in six parts. The first relates to the normal operation of either transmitter and the second to the normal operation of either receiver. The third describes the operation of either receiver in the second mode, that is, after an error is received. It is natural to begin the description of the second mode of operation with the receiver as it is this equipment that detects the error and determines that the second mode of operation is to ensue. The fourth part of the circuit description relates to the second mode of operation of either transmitting circuit. The fifth part describes the procedure for reinserting a removed channel into the system. The sixth part is a summary of the circuit operation.

In the following description it must be borne in mind that, as shown in FIG. 1, FIGS. 2–5 and 6–8 show the transmitting and receiving circuits, respectively, in the first direction. Almost identical equipment comprises transmitter 2 and receiver 2, the differences between the two pairs of equipment to become apparent hereinbelow. When referring to elements in transmitter 2 and receiver 2 similar or analogous to those in FIGS. 2–8, these elements will either be specifically described as being in the latter two pieces of equipment or they will be preceded by the adjective "equivalent." Thus, "relay A1" refers to a relay in receiver 1 of FIGS. 6–8 while "equivalent relay A1" refers to a similar relay in receiver 2.

I. NORMAL OPERATION OF TRANSMITTING CIRCUIT

The data which is to be transmitted in each direction pertains to the states of a set of relays. Each of the two sets of relays is physically located in one of the two receiver circuits as will be described hereinbelow. The transmitting circuit, however, must be connected to the receiving circuit to determine the information content of each subset or "word" of relays. This connection is shown in FIG. 1 symbolically by the dashed arrows. In actuality, each relay when energized may connect a source of potential to an electrical conductor. These electrical conductors are connected to the transmitting circuit.

Each set of relays is arranged in the illustrative embodiment of the invention in sixteen groups, 0 through 15. Each group contains twelve relays designated 0 through 11. The energization states of all twelve relays in each of fifteen of the sixteen groups are determined either by external circuitry at the location of that set of relays or by the transmission of the energization state data of the equivalent relays in the array at the other end of the transmission circuit. The sixteenth group of relays at each end contains the four special relays referred to above, these four relays determining in which mode the system is operated. In addition, this group contains two other special relays which function when a rescan is desired as will be described below. The other six relays in the sixteenth group may be used in the same manner as all the relays in the other fifteen groups or for other special purposes. For the transmission analysis, however, it does not matter for what purpose each relay is utilized. Information pertaining to all twelve relays in each of the sixteen groups is transmitted from end to end. It is in the receiving circuits that the six special relays initiate the automatic modification of the transmission system. These relays and their effect on the circuit will be described in those sections of the description pertaining to the second mode of operation (infra, parts III and IV).

The twelve electrical conductors of each group containing thereon voltages indicative of the energization states of respective ones of the twelve relays by which they are controlled are connected to a respective gate group 211– in the transmitting circuit at the same end. There are sixteen gate groups 0 through 15 within primary scan gate 210, three of which are shown. Each gate group is labeled by a different one of the two-element numeric designations 211–0 through 211–15, the second element indicating which gate group is under consideration. The twelve electrical conductors from the receiving circuit associated with each of the sixteen groups of relays are connected to the twelve input terminals of a different gate group 211–. The states of the twelve relays in a particular group are determined by scanning the twelve electrical conductors controlled thereby. Each electrical conductor is maintained at either one of two potentials, a nonzero potential indicating that the associated relay is energized and ground potential if it is not. The twelve electrical conductors in each group are connected through resistive networks directly to a set of twelve AND gates 212. These AND gates are of the type which produce an output pulse only if both inputs are energized. One of the inputs of each of the twelve AND gates in any group is connected to a common conductor 224–. The sixteen conductors 224– are energized in sequence. Thus there is only one group of gates which is operated at any one time. At the moment that the particular conductor 224– is energized by the scanning circuit, those gates in the selected group whose associated electrical conductors connected to the receiving circuit relays are at the nonzero potential provide output pulses on the respective conductors 213–.

The secondary scan gate 217 consists of twelve OR gates 218–0 through 218–11. The 218–0 OR gate has as its input terminals the outputs of the "0" gates in each of the gate groups 211–. These OR gates 218– are of the type in which an output pulse is provided on respective conductors 221–0 through 221–11 if at least one of the inputs is energized. Each of the twelve OR gates is connected to an AND gate in each of the gate groups 211–. For example, OR gate 218–11 has as its inputs the output of AND gate 11 in each of the sixteen gate groups. Thus when a particular gate group 211– is operated by the application of a scanning pulse on the respective one of conductors 224–, effectively, the electrical signals at the inputs of that gate group are connected to the twelve respective OR gates 218–. These electrical conditions then appear on respective conductors 221–0 through 221–11. For example, if in relay group 15 relays 0 and 10 are energized and the remaining relays are not, when a scanning pulse is applied to conductor 224–15, electrical signals appear on only output conductors 213–15–0 and 213–15–10. The second element in each of these three element designations relates to the gate group and the third element to the particular gate in that group. The output conductors 221– which are energized in response to the scanning of gate group 15 are therefore conductors 221–0 and 221–10 only.

The scanning pulses are applied in succession to conductors 224–0 through 224–15 by the clock 230. This clock applies scanning (S) pulses to conductor 247. These pulses pass through delay 214 to one input of each of the sixteen AND gates 219–. These AND gates are similar to gates 212 in that output pulses are provided on the output conductors 224– only if both inputs are energized. The same pulse on conductor 247 is applied through conductor 249 to the input of the four-stage counter 350. Each stage A0 through A3 of this counter contains two outputs connected to respective conductors 351–. The three-element designations of the conductors 351– describe to which stage and which output of that stage the conductors are connected. The second element in the label designates the stage and the third designates the "zero" or the "one" output of that stage. Pulses are applied to the counter input and energize the stages in the well-known manner. The two output conductors of each stage are connected to inputs of the translator 340. This translator has sixteen output conductors 380–0 through 380–15. For each binary sequence within counter 350 only one of the sixteen conductors 380– is energized. For example, if stages 3 and 0 of the four-stage counter are in the "one" state and stages 1 and 2 are in the "zero" state, the binary value stored in the counter is nine. Thus, only the 380–9 conductor, not shown in the drawing, of conductors 380–0 through 380–15 is energized. Successive input pulses to the four-stage counter cycle this counter and energize successive output conductors of the binary to one-out-of-sixteen translator 340.

Each of the conductors 380–0 through 380–15 is connected by a different one of the conductors 246–0 through 246–15 to an individual one of AND gates 219–. It is seen, therefore, that each clock pulse although energizing one input of each of the AND gates causes only one of the sixteen conductors 246– to be energized and consequently only one of the AND gates 219– to be operated. In this manner the successive scanning pulses are applied to conductors 224–0 through 224–15. Delay 214 is provided to insure that the two pulses to the selected AND gate arrive at the same instant. Some finite time is required for the counter stages to advance and for the translation to occur. Delay 214 is adjusted so that the pulse applied to the selected one of conductors 246– arrives at the selected gate 219 at the same moment that the pulse applied directly through the delay 214 arrives.

Each of the output conductors 221–0 through 221–11 is connected to the S input of a different one of the bistable elements 222–0 through 222–11. The output pulse on a conductor 221– sets the associated bistable element in the "one" state which in turn applies an output pulse to the respective conductor 216– connected to the "1" output. The remaining untriggered bistable elements are in the reset state and no output pulses are applied to the respective conductors 216–. Prior to the application of each scanning pulse to conductor 247, a reset (R) pulse is applied by clock 230 to conductor 231. This pulse resets each of the twelve bistable elements. In this manner when the scanning pulse is applied, the only bistable elements which are set are those coupled to the operated relays in the scanned group.

The twelve output conductors 216–0 through 216–11 thus contain one of two signals indicative of the enerization states of particular relays in the group being scanned. This information is stored in two shift registers 410 and 420. The first six bits of any word indicative of the energization states of the first six relays in the group are stored in the fourth through ninth stages of the register 420. Conductors 225–0 through 225–5 connected directly to output connectors 216–0 through 216–5 cause these stages to be set in accordance with the electrical conditions of the respective output conductors. If one of the relays 0 through 5 in the group being scanned is energized, the associated stage of the register 420 is set and is placed in the "one" state. Similarly, output conductors 216–6 through 216–11 are connected directly to the fourth through ninth stages of register 410 by respective conductors 225–6 through 225–11. In a similar manner if a particular one of relays 6 through 11 in the scanned group is energized, the respective stage of the shift register 410 is set in the "one" state.

The two shift registers pulse out the two halves of each word into two distinct channels in the manner to be described below. However, it is not necessary to transmit every word. Only if the energization states of any of the relays in the group being scaned have changed subsequent to the last scan it is necessary to transmit this information in order to make the appropriate changes in the equivalent group of relays at the other end. For this reason the states of each group of relays are stored in the memeory of a comparator circuit. The energization states of the relays determined by each scan are compared to the energization states determined by the immediatly previous scan. It is only if a change has occurred in the word being scanned that a signal is obtained for initiating the transmission of the information presently stored in the two transmitting shift registers.

The core memory 320 comprises a plurality of cores 321 having two remanent magntization states. There are twelve rows of cores and sixteen columns. Each column stores binary information pertaining to the energization states of one set of relays or word. For example, the left-most column stores information pertaining to the 0 group with the core in the first row representing the first relay in this group, the core in the second row representing the second relay in this group, etc.

The output indication on each conductor 216–0 through 216–11 indicative of the energization state of an individual one of the relays in the particular group being scanned, is applied through a respective one of the amplifiers 226–0 through 226–11 to a respecvtive one of the conductors 227–0 through 227–11. The amplifiers apply to the respective conductors only positive pulses, these positive pulses being applied if the respective relays are energized. If they are not energized, no current pulse is applied. The positive current pulses are sufficient for setting the magnetization states of every core in the row to which they are applied in the clockwise direction. However, no cores are set merely by the application of a current pulse to one of the conductors 227–0 through 227–11. Negative source 373 applies a continuous biasing current to conductors 374 passing through the cores in the array. Source 373 and resistor 372 are adjusted so that the magnetomotive force applied to each of the cores in the array is in the counterclockwise direction and is of a magnitude equal to one-half that required to set the magnetizations of the cores. Thus, at all times each core has applied to it a magnetomotive force having a magnitude equal to one-half of the switching value in the counterclockwise driection. The cores in any row through which are passed positive current pulses on one of conductors 227– of the full switching magnitude thus have applied to them a total magnetomotive force equal to one-half the switching value in the clockwise direction, this value being the sum of a full switching magnetomotive force in the clockwise direction and half of this value in the counterclockwise direction. Those cores through which positive current pulses are not passed, these cores being coupled to those of conductors 227–0 through 227–11 associated with unenergized relays, have applied to them only a countrclockwise magnetomotive force of half the switching valve determined by source 373 and registor 372. The net result is that an energized relay in a selected group results in the application to the associated row of cores magnetomotive forces of one-half the switching magnitude in the clockwise direction. All cores in any row associated with an unenergized relay have applied to them magnetomotive forces of one-half the switching value in the counterclockwise direction.

Immediately after the application of a reset pulse to conductor 231 followed by a scanning pulse on conductor 247, the clock 230 applies a positive pulse to conductor 232 connected to the S0 output followed by a positive pulse on conductor 233 connected to the S1 output. The pulse on conductor 232 is applied to one input of one of the two AND gates 338– associated with each column of the matrix. The pulse on conductor 233 is applied to one input of the other AND gate 338– associated with each column of the matrix. The second and third elements in each numeric designation and the AND gates 338– represent the column number and the particular pulse applied by one of conductors 232 and 233, respectively. Thus AND gate 338–14–1 is the gate coupled to column 14 and to which an S1 pulse is applied to one of its two input terminals.

The second input terminal of each of the pair of gates 338– associated with a particular column is connected to a respective one of conductors 380–0 through 380–15. Thus at any instant only one pair of gates have their second terminals energized, these gates being the ones connected to the particular energized one of the sixteen outputs of translator 340. It is this translator which enables only those cores in the column associated with the group of relays being scanned to switch magnetization states.

In the example above in which group 0 is being scanned and in which only relays 0 and 10 are energized immediately after the application of the scanning pulse to conductor 247 with the subsequent storing of the binary information in the two shift registers and the application of either clockwise or counterclockwise magnetomotive forces to each row of cores, the S0 pulse is applied. This pulse has no effect on any of the AND gates other than AND gate 338–0–0. Although 16 of the 32 AND gates 338– have applied to them the S0 pulse, of these only AND gate 338–0–0, having its second input terminal connected to the energized conductor 380–0, is operated. The operation of AND gate 338–0–0 causes the associated amplifier 337–0–0 to be operated. Immediately after the application of the S0 pulse to conductor 232, the S1 pulse is applied to conductor 233. In a similar manner although sixteen of the AND gates 338– have applied to them this S1 pulse, of these only gate 338–0–1 has its second input terminal connected to energized conductor 380–0. In a similar manner only amplifier 337–0–1 is operated.

The sixteen amplifiers 337– of which only one is operated upon the application of the S0 pulse to conductor 232, apply to respective conductors 370 positive pulses having magnitudes equal to one-half of the current required to switch the magnetization state of any core. Thus these positive current pulses are insufficient for switching the magnetization state of any of the cores to which they are applied in the particular column. However, those cores having applied to them counterclockwise magnetomotive forces of one-half the switching value, that is, those cores in a row associated with an unenergized relay, have applied to them the full switching counterclockwise magnetomotive force. Consequently, these cores may switch magnetization states to the counterclockwise direction if they were priorly in the clockwise direction. Immediately thereafter, the particular amplifier 337– controlled by the S1 pulse applied to conductor 233 and connected to the one energized output conductor 380– applies a positive pulse to the particular conductor 371. This current pulse applies a magnetomotive force to all cores in the associated column in the clockwise direction which also has a magnitude equal to only half of the switching magnetomotive force. Only those cores in that column having applied to them another magnetomotive force in the clockwise direction equal to one-half the switching value as a result of their coupling to a particular one of conductors 227– controlled by an energized relay switch magnetizations to the clockwise direction if they were not originally in that state.

It is thus seen that the information content of any word, representing the energization states of a particular group of relays, is stored in a particular column of cores. If the present information content of this word differs from the information content of the previous word, that is, if the energization states of the relays of the group being scanned have changed in any manner whatsoever, some cores change magnetization states. A change in magnetization state of any core to the counterclockwise direction occurs upon the application of the S0 pulse to conductor 232. A change in the magnetization state of any core to the clockwise direction occurs immediately thereafter upon the application of the S1 pulse to conductor 233. Sense conductor 375 passes through each core of the array and is connected to sense amplifier 360. This conductor has induced thereon positive voltage pulses in response to the switching of any flux to the counterclockwise direction and negative pulses in response to the switching of the magnetization of any core to the clockwise direction. The pulses of negative polarity follow those of positive polarity if the two of them appear. If there has been a change in magnetization state in only one direction only one of the two pulses is obtained. If the previous word is identical to the present word, no cores switch magnetization states and no induced pulses result. The appearance of both pulses or either one of the two pulses individually is an indication that there has been some change in the group of relays being scanned and consequently the shift registers must outpulse their information to the receiving circuit. The sense amplifier 360 applies a pulse on conductor 361 in response to either or both polarity induced pulses appearing on the sense conductor 375. It is this pulse on conductor 361 that initiates the transmission.

It is apparent to those skilled in the art that the memory array 320 which is incorporated in my invention for comparing two successive words is different from those used in conventional applications. The reason for this is that it is desired to utilize only a single sense conductor through all cores to determine the switching of magnetization state in any core. If the cores in any word switching magnetization states in one direction were to do so simultaneously with the same number of cores switching magnetization states in the other direction, it is apparent that equal and opposite polarity voltages would be induced in the common sense conductor. Rather than providing a different sense conductor for each row in order that the induced pulses not "mask" each other, the opposite polarity column magnetomotive forces are applied in succession as explained. Thus, the switching of magnetization states in the two directions never occur simultaneously and the induced pulses are precluded from masking each other. A comparator memory circuit of this type is disclosed and claimed in my copending application, Serial No. 127,025, filed July 26, 1961.

With the appearance of the output pulse on conductor 361, the two-half words stored in the respective fourth through ninth stages of shift registers 410 and 420 are transmitted. However, the receiving equipment must be notified which word is being transmitted, that is, it must be told information concerning which group of relays is being operated upon. For this reason address information is transmitted with the information data. Four bits are required to address sixteen words. The four-stage counter 350 contains the necessary binary information for determining which group is being scanned as it is this counter which determines which one of the sixteen groups is scanned in the first place. For this reason the four stages are connected directly to the four address bits. Stages A0 and A1 are connected directly by conductors 353–0–1 and 353–1–1 to the second and third stages in shift register 410. The second element in each of these three element designations refers to the particular stage of counter 350 or the particular bit in the address. The third element indicates that these conductors are connected to the "one" outputs of the respective stages. If these stages are in the "one" state the respective address bits are likewise placed in the "one" state. Otherwise these stages are in the "zero" state. In a like manner conductors 352–2–1 and 352–3–1 set the second and third stages of register 420 in the appropriate manner.

The reset pulse applied to conductor 231 for resetting each of the bistable elements 222–0 through 222–11 immediately prior to each scan is likewise applied to conductor 259. This reset pulse resets the second through ninth stages of each register in the "zero" state. In this manner those of the address bits not connected to stages of the counter 350 in the "one" state are in the "zero" state when the transmission begins. Similarly, those of the fourth through ninth stages in each register not connected to bistable element 222–0 through 222–11 in the "one" state remain in the "zero" state. Thus, when transmission begins in response to a pulse appearing on conductor 361 the second through ninth stages of each of the two registers 410 and 420 contain the correct binary values.

The reset pulse applied to conductor 259 which is applied directly to the reset terminal of register 420 and via conductor 413 to the reset terminal of register 410 always sets the first and tenth stages of these registers in the "one" state. Although the second through ninth stages are always reset to the "zero" state, it is necessary that the first and last bits in each register be in the "one" state when transmission begins for reasons to be particularized below.

The reset pulse from clock 230, in addition to resetting the bistable elements 222– and the two shift registers 410 and 420, resets the counters 510, 525, 550, and 555, and the ten-count counter 540. The reset pulse, applied prior to a scanning pulse on conductor 247, is connected via conductors 259, 413, 414, 571, 542, 526, 553, and 558 to the reset terminals of the above identified five elements. It is necessary that these five components be reset prior to each scan.

When counter 510 is in the reset condition output 1 is unenergized. Thus, relay 500 is unoperated and no pulse is transmitted via conductors 508 and 452 to one of the three inputs of OR gate 450. In normal operation, therefore, these elements need not be considered. Similarly, with counter 525 in the reset state, relay 520 may be neglected and no pulses are applied via conductors 523 and 451 to a second one of the three input terminals of OR gate 450.

In addition, all relay contacts are open or closed as shown in the drawing and those conductors containing open contacts may be neglected in the description of the normal operation.

The reset pulse, when applied, sets the first and last stages of each of the two shift registers in the "one" state. The tenth stage containing the start bit is made a "one" to notify the receiving equipment that a new word is being transmitted. The demodulating equipment must provide shift pulses for the shift register inputs in the receiving circuit to be described in detail below. These shift pulses are generated by the demodulating equipment in response to the appearance of a start bit. For this reason each transmitted half-word begins with a bit having the binary value one.

At this point the two half-words are stored in the shift registers along with the address information and a pulse appears on conductor 361 to one input of OR gate 430, an indication that the word stored must be transmitted. The output pulse from OR gate 430 sets flip-flop 425. In the set condition output "0" is grounded and a nonzero voltage appears at output "1." The relay 435 connected to grounded output "0" at one end and ground itself at the other end becomes inoperative. Contacts 435–1 remain open and since in the normal condition contacts 437–2 and 436–2 are open, relays 436 and 437 do not operate. For this reason the contacts controlled by relays 435, 436, and 437 remain in the normal condition and these three relays may be neglected in the ensuing operation.

Output "1," on the other hand, applies a nonzero voltage via conductor 460 to the third of the three inputs of OR gate 450. This voltage is transmitted through gate 450 and via conductor 255 to the inhibit input terminal of the clock 230. Because the words stored in the two shift registers are to be transmitted further scanning pulses must be inhibited, for the next word must not be stored in the shift registers until the presently stored word is transmitted. Thus, further reset pulses, scanning pulses, and S0 and S1 pulses are inhibited.

Pulses are continuously applied by the clock 230 at the C terminal and travel via conductor 254 to the input of gate 455. This gate is of the type which transmits pulses to the output conductor 457 provided the control terminal connected to conductor 456 is unenergized. Initially flip-flop 535 is in the reset condition as will be explained below, conductor 456 is unenergized, and clock pulses are transmitted through gate 455 to conductor 457.

These clock pulses are transmitted to one input of each of the three AND gates 440, 441, and 442. The second input terminals of gates 440 and 442 are unenergized because counters 510 and 525 are in the reset condition with the "1" outputs unenergized. The second input terminal of AND gate 441, on the other hand, connected to output "1" of flip-flop 425, is energized and thus only gate 441 of AND gates 440–442 transmits the clock pulses. Clock pulses are transmitted through AND gate 441 to conductors 461 and 462. These pulses pass through normally closed contacts 436–3 and 437–3 to respective shift control leads 412 and 422. These clock pulses appearing on the shift inputs of the two shift registers cause the bits within the registers to be successively pulsed out onto respective conductors 411 and 421, a nonzero current pulse representing a "one" and the absence of a pulse representing a "zero." These bit pulses are transmitted through respective gates 562 and 567 and respective normally closed contacts 436–5 and 437–5 to the two respective modulators. Gates 562 and 567 permit these pulses to go through as the inhibit inputs connected to respective conductors 561 and 566 are normally unenergized. One input of each of the AND gates 560 and 565 is connected to the initially unenergized "1" outputs of counters 550 and 555. The other inputs connected to conductors 572 and 573, respectively, are similarly unenergized.

It is necessary to provide each half-word with a parity check. The total number of "ones" in each half-word is arbitrarily made odd in number. The error bit in each shift register is always a "one" as a result of the application of the reset pulses prior to each scan. This parity bit in each shift register is to be transmitted only if it will make the total number of "ones" transmitted in each channel odd in weight. The parity bit operations are controlled by the counter 540, counters 550 and 555 and the associated equipments. Each clock pulse through gate 441 in addition to being applied to conductor 462 appears on conductor 446 connected to the input of the ten-count counter 540. This counter is a conventional type wherein an output pulse appears on conductors 545 and 541 only when a tenth pulse is counted. Thus during the tenth clock pulse a pulse is applied via conductor 541 and respective conductors 572 and 573 to the second input terminal of each of the gates 560 and 565.

Each "one" pulse transmitted along conductor 411, in addition to traveling to the respective modulator, is applied to and advances counter 550. This counter is in the "one" state whenever an odd number of "ones" have been applied at its input, C. After nine bits have been transmitted, the counter, if in the "zero" state because of an even number of "ones" sent, has output "1" unenergized. AND gate 560 does not operate and the tenth bit, a "one," is transmitted, making the total number of "ones" sent odd in number. If, on the other hand, after nine bits an odd number of "ones" have been sent, the last bit, a "one," should not be transmitted. Since an odd number of pulses have been applied to counter 550, the "1" output is energized. When the last pulse, always a "one," is outpulsed on conductor 411, counter 540 having counted ten shift pulses applies a pulse to conductor 541. This pulse is applied to the second input of AND gate 560. Since both inputs are energized the gate operates and conductor 561 is energized. Gate 562 is inhibited and the last bit is prevented from passing through the gate 562. In this manner, if by the tenth bit and odd number of "ones" have already been sent, the tenth bit is blocked. If an even number of "ones" have been transmitted, the input of gate 560 connected to counter 550 is unenergized and the tenth bit passes through gate 562.

Counter 550 is adjusted so that input pulses do not step the count immediately. A delay is provided at the input for the following reason. If the tenth bit, the parity "one" bit, is to be transmitted, gate 560 must remain unenergized for the duration of the bit. Counter 550 is initially in the "zero" state and gate 560 is unoperated. Were the tenth bit itself to advance counter 550, the "1" output would become energized and the gate 560 would operate, thus cutting off the last part of the pulse. By providing the delay within counter 550, although the tenth pulse energizes the "1" output, it is not so energized until the pulse has completely passed to the modulator.

The pulse from counter 540 on conductor 541 has a duration equal to that of the tenth pulse from register 410. If the parity "one" bit is to be blocked, gate 560 must operate for its entire duration. Thus the duration of the pulse on conductor 541 is sufficient to keep gate 560 operated until the parity pulse has terminated.

Counter 555, gate 565 and gate 567 operate in a similar manner to provide an odd number of "ones" transmitted along channel B.

The pulse applied at the output of counter 540 to conductor 545 is blocked by normally open contacts 436–4 and 437–4 from setting counters 510 and 525. This pulse, however, does set flip-flop 535 as conductor 537 contains no open contacts therealong. Flip-flop 535 sets and the now energized output "1" connected through delay 532 by conductor 533 to relay 530 causes the latter to operate. When the flip-flop 535 initially sets, gate 455 is inhibited from operating as the inhibit terminal is now connected via conductors 456 and 533 to the energized "1" output of the flip-flop. The eleventh clock pulse applied is no longer passed by gate 455. Thus the eleventh and successive clock pulses do not pass through gate 455 and no information can be shifted out of the two registers.

The output pulse on conductor 545 from counter 540 which is applied after the tenth clock pulse is counted travels along conductor 427 to the reset terminal of flip-flop 425. This flip-flop resets and output "1" is no longer energized. Thus a voltage is no longer applied to gate 450 and along conductor 255 to the inhibit terminal of the clock 230. Upon the termination of the inhibit voltage on conductor 255, scanning ensues. At this point, however, clock pulses are ineffective even if another word stored in shift registers 410 and 420 is to be transmitted. Output "1" of flip-flop 535 is energized and consequently gate 455 does not transmit the clock pulses.

The gate is not closed once again until relay 530 operates at which time a clock pulse travels along conductors 254 and 580 (as contacts 530–1 are now closed) and flip-flop 535 resets. Upon resetting, output "1" is unenergized and gate 455 once again transmits clock pulses. The next word is transmitted if by this time flip-flop 425 has been set by a pulse on conductor 361.

Thus, even if the next word stored in the shift registers is to be transmitted, transmission is prevented for a time interval equal to the delay of delay 532, that is, until relay 530 operates. The receiving circuit must be given time to operate upon the previous word transmitted before the present one is sent. This is achieved by blocking the clock pulses for a sufficient time interval.

If during this time interval another word stored in the shift registers is determined by the comparator circuit to require transmission, flip-flop 425 sets. Further reset, scanning, S0 and S1 pulses are inhibited. The word remains in the registers and transmission begins immediately after gate 455 closes in response to the "1" (set) pulse from flip-flop 535 finally operating relay 530 and a clock pulse resetting this flop-flop and thus removing the inhibit voltage from gate 455.

In this manner it is seen that in the normal operation of the circuit, one-half of each data word with one-half of its address is transmitted along each one of the two data links. The operation is continuous with the only words transmitted being those different from the words previously stored in the same respective groups of relays. Successive words are separated by a time interval at least as great as that required by the receiving circuit to operate upon an incoming word. And each half-word is provided with a parity check, the last bit being a "one" only if it makes the total number of "ones" in the particular half-word transmitted odd in number.

II. NORMAL OPERATION OF RECEIVER

Referring back to FIG. 1, the receiver of my invention is connected to the two demodulators A1 and B1 coupled respectively to channels A1 and B1. The demodulators reconvert the information transmitted into the original series of pulses at the inputs of the two modulators A1 and B1. In addition, the two demodulators perform an auxiliary function. As will be seen shortly each train of data pulses feeds into one of two receiving shift registers. These shift registers require shift pulses as did those in the transmitting circuit. The shift pulses for the receiving shift registers originate in the two demodulators. A shift pulse is generated by each demodulator for each data bit whether the bit is a "0" or "1." The data pulses from demodulator A1 arrive on conductor 690; the associated shift pulses are on conductor 691. The data or information pulses from demodulator B1 appear on conductor 692 with the associated shift pulses on conductor 693.

The first data pulse on conductor 690, always a "one," enters the first stage 738 of shift register 720. Prior to each train of pulses in a different word, shift registers 720 and 730 are reset in a manner to be explained below. Thus after the registers are cleared the first data pulse from channel A1 is stored in stage 738. Immediately thereafter the first shift pulse shifts this "one" to the second stage. The second data pulse then sets the first stage in the appropriate "zero" or "one" state. The second shift pulse then shifts the first two bits in the first and second stages to the second and third stages, respectively. This sequence of operations continues until the tenth data bit is stored in the first stage. Only nine shift pulses are applied to each shift register so that after the tenth data pulse sets the first stage of register 720, the entire half-word appears in that register.

The first bit in each half-word is a "one" as explained above. The first bit transmitted along channel A1 not only notifies demodulator A1 to generate the shift pulses for the incoming half-word but in addition energizes conductors 735 and 742 after the half-word is completely stored in shift register 720. The storage is complete when the last stage 792 contains the "one" start bit. These conductors, connected to the "1" output of stage 792, are energized only when this stage is set after the application of the ninth shift pulse. A slight delay is associated with this stage to enable the energization of the two conductors only after the tenth and last bit is stored in stage 738.

One-half of the address and one-half of the information data are thus stored in the second and third and fourth through ninth stages, respectively, of shift register 720. Each stage has associated therewith two output conductors. The left-most of each of these conductors is energized if a "zero" is stored in the associated stage and the right-most conductor is energized if a "one" is stored therein.

Shift register 730 is identical to shift register 720 with conductors 708 and 744 connected to the "1" output of the last stage 732. The output conductors 725 through 728 are similar to conductors 721 through 724 and serve the same purpose. Conductors 721 through 724 and 725 through 728 cause a particular column of relays in the relay matrix to be set in accordance with the information data stored in the fourth through ninth stages of the two shift registers.

Before the relays are set, however, it is necessary to determine that no errors have been transmitted. AND gate 703 is of the type in which an output is applied to conductor 702 only in response to the energization of the four conductors 742, 632, 633, and 744. After the storage of both half-words in the two shift registers, conductors 742 and 744 are energized. Conductors 632 and 633 are energized, however, only if no error has occurred in the two half-words transmitted.

The data pulses on conductor 690 in addition to being applied to shift register 720 are applied at the input of counter 630. Upon recipt of the first "one" transmitted, the "0" output of this counter is energized. The second bit of binary value "one" causes the "1" output to be energized, the third "one," the "0" output, etc. It is seen that upon the completion of the half-word transmitted along channel A1, if the total number of "ones" transmitted is odd, conductor 632 is energized. This is an indication that no error has occurred in the transmission of this half-word and the second input of AND gate 703 is energized. In a similar manner counter 620 counts the number of "ones" transmitted in channel B1 and if this number is odd, conductor 633 connected to the third input of AND gate 703 is energized. The four inputs of AND gate 702 are thus all energized and a pulse appears on conductor 702. This pulse is applied to translator 800 and initiates the storage of the transmitted data in the appropriate column of relays.

It should be noted that the pulse applied to conductor 735 connected to the "1" output of stage 792 is ineffective during normal operation of the receiver circuit. This pulse is blocked by normally open contacts B1–1 on conductor 612. This pulse is also applied via conductors 735 and 636 to one of the two inputs of AND gate 634. At the instant that this pulse is applied, however, counter 630 is in the "0" state and thus conductor 631 is unenergized. AND gate 634 does not operate. The pulse is also ineffective for operating counter 640 as it is blocked by normally open contacts 750–3 and 660–3. Similar remarks apply to the pulse on conductor 708.

The pulse applied at the gate input of translator 800 enables only one of sixteen relays connected by conductors 850– to the translator to be operated. Relay 822, associated with the first column, is connected by conductor 850–1 to the first output of translator 800. If this output is energized, current flows from source 851 through conductor 850–1 and energizes relay 822. In a similar manner the other fifteen relays of which only relay 823 associated with the sixteenth column is shown may be operated. The two stages in each shift register containing address information are coupled by respective conductors 721 through 724 and 725 through 728 to the inputs of the translator 800. Only one of the two conductors connected to each stage is energized depending on whether the respective stage is in the "zero" or "one" state. A particular translator output connected to a respective column conductor 850– is energized in accordance with the binary address information stored in the four address bits of the two registers.

The two output conductors 773 and 774 of the fourth stage of register 730 which contains the first bit of the word transmitted are connected to every relay in the last row of the relay memory 870 in a manner identical to that shown connecting them to the relay in the first and last columns. The left-most conductor 773 is energized if the fourth stage of register 730 is in the "zero" state while conductor 774 is energized if it is in the "one" state. The energization of relay 822 closes contacts 822–1 and 822–2. Current can flow, therefore, from source 825 through either of conductors 835 or 836 to whichever one of conductors 761 through 784 are connected to energized outputs of the shift register stages. Thus, if the first bit is a "zero" and conductor 773 is energized current flows from source 825 through conductor 835 and conductor 773. Similarly, if the bit is a "one," current flows from the source through conductor 836 and conductor 774. The two conductors 773 and 774 are wound in opposite manners about relay 842. If current flows through conductor 774, the relay is energized and contacts 842–1 close. If current flows through conductor 773, the relay is deenergized and the contacts open. A pulse on either of these conductors controls the operation of the relay. The relay is latching, that is, once energized by a pulse on conductor 774, it remains operated until a pulse is applied to conductor 773.

The relays in only one column may be operated at any one time because only one of the column relays, of which only relays 822 and 823 are shown is operated at any instant. In addition, only one of the two conductors coupled to each relay contains thereon a pulse as only one output of each shift register stage is energized at any one time. In this manner that column of relays whose address is contained within the two shift registers is set in accordance with the data stored in the ten information stages of the registers, his data representing the electrical information at the inputs of the particular gate group 211– in the transmitting circuit. The energization of any relay closes a contact and completes an external circuit. The closing of this contact also applies an electrical signal to the respective input in the primary scan gate 210 of transmitter 2 of FIG. 1. For example, when relay 842 is energized and contacts 842–1 close, conductor 861, of which only a part is shown, not only controls an external circuit but in addition applies a nonzero potential to the "0" input of gate group 211–0 within primary scan gate 210 of transmitter 2.

Within relay memory 870 are the four special relays A1, B1, A2 and B2 and the two special relays RR1 and RR2. The energization of any one of these relays will be shown to modify the transmitting or receiving equipment in one of the two direction for the second mode of operation. If either of relays A1 or B1 is operated transmitter 1 and receiver 1, respectively, transmit and receive the data over only one of the two associated channels. Receiver 1 will be shown to be automatically modified in response to the operation of either relay A1 or relay B1. Transmitter 2, to whose primary scan gate inputs are connected the conductors whose contacts such as 842–1 or A1–1 are controlled by the relays in memory 870, automatically transmits the information to receiver 2 where the particular equivalent relays are operated. The operation of relay A1 or B1 in receiver 2 modifies transmitter 1 for the appropriate mode of operation. If, on the other hand, either of channels A2 or B2 has become inoperative, one of the relays A2 or B2 in receiver 2 is operated. This information is sent from transmitter 1 to receiver 1 where the appropriate one of the relays A2 or B2 is operated. The operation of one of these relays modifies transmitter 2 for the appropriate mode of operation. In the normal operation all four of the relays A1, B1, A2 and B2 in each of the two receivers are unoperated. Similar remarks apply to relays RR1 and RR2.

Relays A1, B1 and RR1 are shown in dotted outlines because they appear elsewhere in the drawing. Relay A1 is wound by conductor 758 as shown at the top of FIG. 7. Similar remarks apply to relay B1 and conductor 651 and relay RR1 and conductor 635 at the bottom of FIG. 6. Since these relays also control the electrical signals at their respective scan points they are symbolically represented in the memory matrix. In addition, relays A1 and B1 are operated as are all other relays of the array (except relay RR1) by the energization of the appropriate shift register stages. Relay RR1 is the sole relay in the array which is not operated by the shift registers and is included in the array only because, as the other relays, it controls a scan point in primary scan gate 210 of transmitter 2.

These six special relays are shown in the last column, the sixteenth word. Relay A1 is shown in detail as the "0" bit within this word. The other five relays are shown symbolically only. All six of these relays, however, may be placed anywhere within the memory array 870. In the illustrative embodiment they occupy six bits in the sixteenth word. As has been stated, the remaining six relays in this word may represent other information of the same type as that represented by the remaining fifteen columns of relays or any other special type of information required.

After the transmitted word is stored in memory 870, it is necessary to clear the receiver shift registers and in addition to reset counters 620 and 630. The shift registers must be reset so that new information may be stored therein. The counters must be reset because it has been seen that the "0" outputs are energized after an odd number of ones have been counted. These outputs are both energized after the respective counters have counted all the "ones" in each correctly transmitted half-word. The first "one" in the next half-word would thus energize output "1" rather than output "0" which should be energized after the start bit, a "one," is transmitted. For this reason, both counters must be reset with the "1" outputs energized before the transmission of another word.

The nine shift pulses on conductor 691 are also applied to conductor 694. The pulses advance the nine stage counter 696. After nine pulses have been applied OR gate 698 operates and a pulse is applied to conductor 604. This reset pulse is delayed by delay 605 for the time interval necessary to operate the selected column of relays in memory 870. When the relays have been appropriately energized the pulse appears on conductor 618 and resets the two counters 620 and 630. In addition, the pulse is applied to conductors 628 and 791 and resets each of the two shift registers. This pulse also clears translator 800. In this manner the circuit is once again in the initial condition and a new word may be transmitted. The new word is transmitted at a time after the transmission of the present word determined by delay 532 as has been explained. This delay in the transmitting circuit is sufficient to allow the reception of both half-words, the setting of the appropriate relays in memory 870 and the resetting of the receiving circuit.

Counter 696 automatically resets itself when a time interval less than the delay of delay 532 but greater than the time between successive shift pulses has elapsed since the last applied shift pulse. In this manner, even if the first bit in the half-word on channel A1 is mutilated and the shift pulses are not synchronized with the data pulses, the counter 696 resets. The counter is thus reset before the next word is transmitted, the start bits of each half-word cause nine shift pulses to be applied and the transmitting and receiving circuits are synchronized with each other.

In the illustrative embodiment of the invention the two sets of relays in receiver 1 and receiver 2 are maintained in identical states. Each relay in each array is operated either by transmitted data or by external signals. It is apparent, however, that in many systems only some of the relays in receiver 1 will be operated by external controls at that location, the remaining relays being operated only by transmitted data. Similarly the relays in receiver 2 equivalent to the relays in receiver 1 which are operated only by external controls might operate only in response to transmitted data. And those relays in receiver 2 equivalent to the relays in receiver 1 operated only by transmitted data might in turn be operated only by external signals at the location of receiver 2. My invention is applicable to this type of system as well, the only difference being that the stages of the receiving shift registers are each coupled to fewer relays in the arrays.

It should be noted that although the transmission system comprises a closed loop, that is, data can be transmitted from left to right and from right to left, the system cannot become unstable. Consider for example that a change has occurred in the fifteenth word in receiver 2 due to external signals, while a different word has been set under outside influence in the fifteenth word in receiver 1. (The means for operating all relays by external signals are not shown in the drawing. These means, however, may consist of any of many well-known pulsing circuits and additional windings on the relays of the memory arrays.) If the fifteenth word stored in the array of receiver 1 is transmitted first, the relays in receiver 2 set appropriately. Thus, the information supplied by the external controls at the location of receiver 2 is lost. This is not undesirable however. For example, if the circuit is being used in a distributed or satellite type telephone system, the relays of receiver 1 may be controlled by subscriber action while the relays of receiver 2 may be controlled by a local central office. If a calling party desires to talk to a called party at the same time that the called party desires service, a preference must be given to one of the two requests. In my invention the party at that end where the new word is transmitted first, is given priority. Thus, if the fifteenth word in receiver 1 is scanned and transmitted before the fifteenth word in receiver 2 is scanned and transmitted, the relays of the fifteenth column in receiver 2 are set in accordance with the service request of the local subscriber. Similarly if the fifteenth word in receiver 2 is transmitted first, the calling party's request is given preference. It is possible that both fifteenth words will be scanned and transmitted simultaneously. It is conceivable that if both words are scanned simultaneously during the next scan that again both words will be transmitted. However, this "oscillation" soon ends for it is highly improbable that both transmitters will scan the same word in the two receivers simultaneously many times in succession as the scanning circuits in the two transmitters are not at all synchronized and their periods of operation are determined by the transmission needs of the other words in the respective relay memories.

III. OPERATION OF RECEIVING CIRCUIT IN SECOND MODE

The second mode of operation of the receiving circuit will be described in two parts. The first of these relates to the ensuing operation of the receiver 1 circuit in response to the detection of a single error in either channel A1 or B1 and the operation of relay RR1. In response to the detection of this error, the associated transmitter is notified and, as has been explained heretofore, the entire memory array at the other end is scanned and the information transmitted. In the event that another error does not occur during this scan, the receiver circuit reverts to normal operation. The second part of the second mode of receiver operation relates to the ensuing operation in response to the detection of another error along the same channel during the requested rescan of the array at the other end. If another error is detected by the receiving circuit, one of the two special relays A1 or B1 is operated and the modified operation wherein only one of the two channels is utilized for transmission purposes follows. In a similar manner the description of the transmitting circuit during the second mode of operation will be divided into two parts hereinbelow.

A. *Receiver operation in response to detection of a single error*

Even if a single error has been made in the transmission of either half-word, conductors 742 and 744 are energized as before (unless it is one of the start "one" bits that was mutilated). However, gate 703 does not operate for at least one of counters 620 and 630 is in the "one" state, that is, either one or both of conductors 632 and 633 are not energized. Consequently, the transmitted word is not stored in the memory 870. Both counters and both shift registers are reset after the reset pulse applied to conductor 604 passes through relay 605. The receiving circuit is now in a condition to accept the next word.

However, in response to an error being transmitted along either channel it is necessary to rescan the entire array at the other end and to transmit every word in order to bring the array at the receiving end up-to-date. In addition, it is necessary to modify the receiving circuit so that if another error is received during the rescan of the array, the channel over which both errors occurred is disconnected from the circuits.

Suppose the error was transmitted over channel A1. Consequently when the start bit sets stage 792 of register 720 in the "one" state counter 630 is likewise in the "one" state and conductor 631 is energized rather than conductor 632. Stage 792 applies a pulse via conductors 735 and 636 to one input of AND gate 634. Unlike the normal operation, however, the second input of this gate, connected to conductor 631, is now energized. A pulse is applied to conductor 652 which sets flip-flop 740 and in addition is applied via conductor 626 to one input of OR gate 666 and consequently sets flip-flop 610. The latter flip-flop when set in the "one" state applies a current pulse to conductor 635 and relay RR1, the rescan request relay in the first direction, is operated. This relay shown symbolically in memory 870 controls a scan point in primary scan gate 210 of transmitter 2. This transmitter transmits this information and operates an equivalent relay RR1 in the receiver 2 circuit at the other end. It will be shown hereinbelow how the operation of this equivalent relay modifies transmitter 1 to transmit every word, not only the words having different data bits than those determined by the prior scan. The entire array is scanned and transmitted until flip-flop 610 is reset and relay RR1 deenergizes.

Flip-flop 740 which sets in response to the operation of gate 634 causes relay 750 to be operated. Current flows from source 754 through the relay coil, closed contacts 660–4 and B1–2 to the energized "1" output of flip-flop 740. Contacts 750–1 close. Although conductor 758 now connects relay A1 to conductor 652, this relay does operate. AND gate 634 is of the type whose output pulse is of short duration, this pulse having a width sufficient to set flip-flop 740 but terminating by the time contacts 750–1 close. Consequently, relay A1 does not energize.

The energization of relay 750 operates numerous contacts in the receiving circuit. The receiving circuit not only controls relay RR1 and therefore determines the duration of the rescan of the array at the other end, but in addition removes the inoperative channel in the event that another error is transmitted along the same channel during the rescan of the array. To insure that the entire array at the other end is scanned and the information transmitted, it is necessary that sixteen words be transmitted. The rescan begins when transmitter 2 sends data relating to the energization of relay RR1 and the equivalent relay RR1 in receiver 2 operates. In the event that the sixteenth word in the relay array of receiver 2 has been scanned immediately prior to the operation of relay RR1, the sixteenth word will not be scanned for the time interval necessary for transmitter 2 to transmit whichever of the first fifteen words in memory 870 need to be transmitted. The sixteenth word will then be transmitted and the equivalent RR1 relay in receiver 2 operated. In response to the operation of this relay, the entire array of sixteen words in receiver 2 is scanned and transmitted. Until the scanning circuit of transmitter 2 scans the first fifteen words of memory 870, however, a rescan at the other end does not begin. The receiving circuit of FIGS. 6–8 determines when a rescan is complete by counting the number of words transmitted. The receiving circuit counts sixteen words only and if no new errors occur, relay RR1 is released. It is possible that the first few of the words transmitted by transmitter 1 are words sent before the equivalent RR1 relay has operated. For instance, if two words were transmitted before the RR1 information was sent to receiver 2 only fourteen words would be transmitted before relay RR1 is deenergized at the receiving end. However, this new RR1 information would also not be transmitted immediately to the transmitter 1 end and consequently it is most probable that the other two words would be transmitted before the equivalent RR1 relay was released in receiver 2. Consequently, it is adequate to count sixteen words transmitted from the transmitting end and this insures that in all probability the entire array will have been scanned before the equivalent RR1 relay releases.

Figure 6:
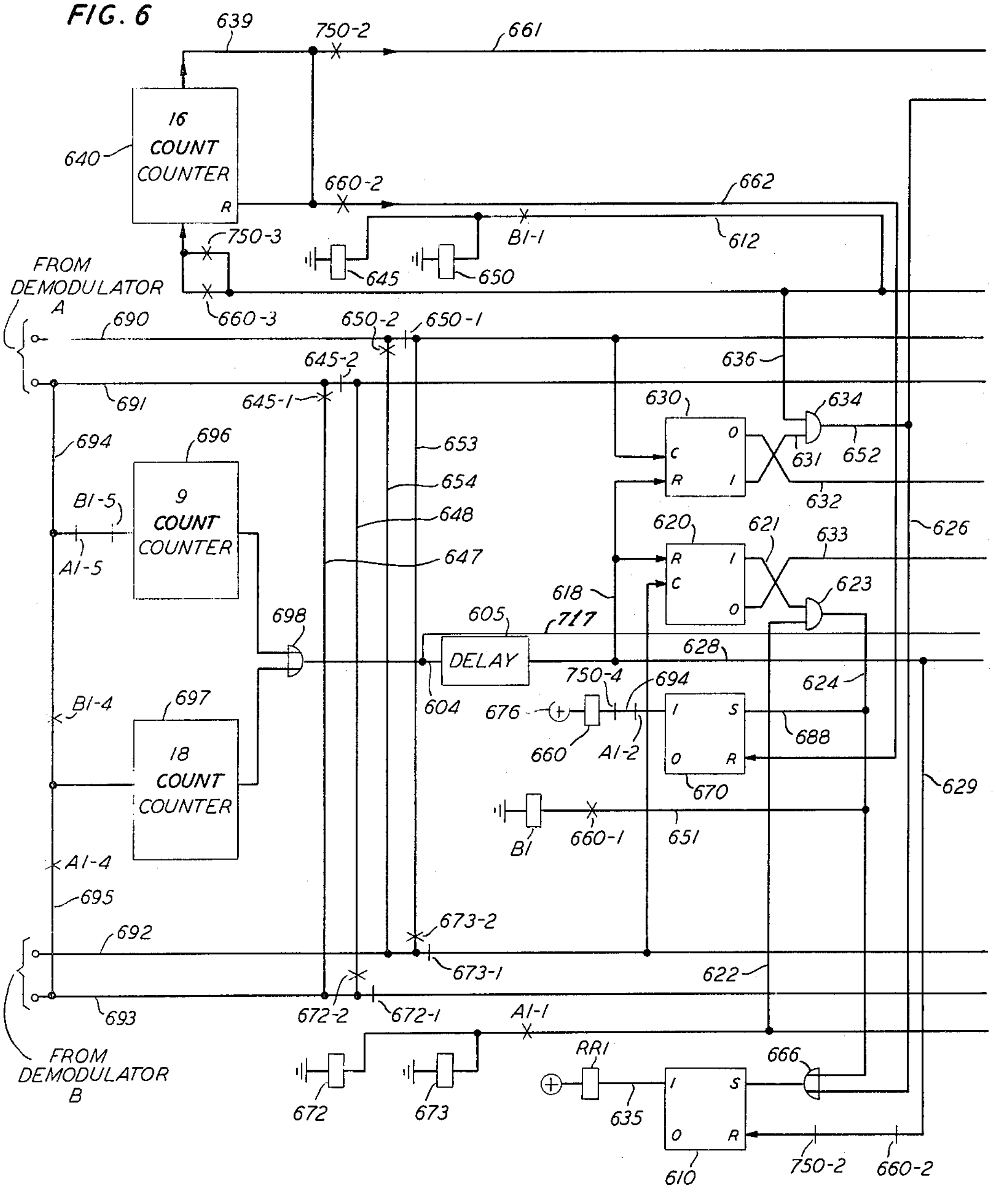
FIGS. 6–8 depict one illustrative embodiment of the receiving circuit of my invention.
Figure 7:
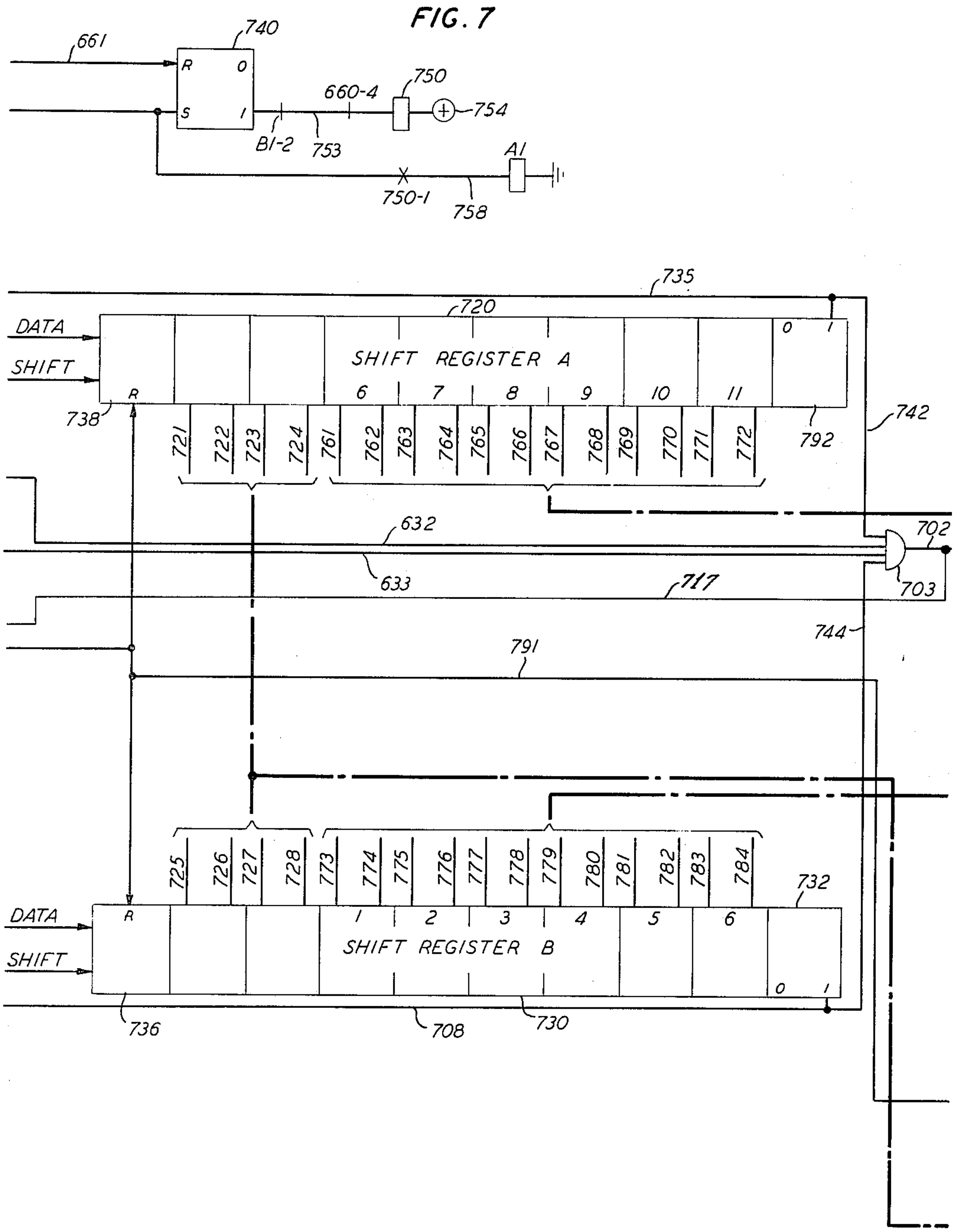
Figure 8:
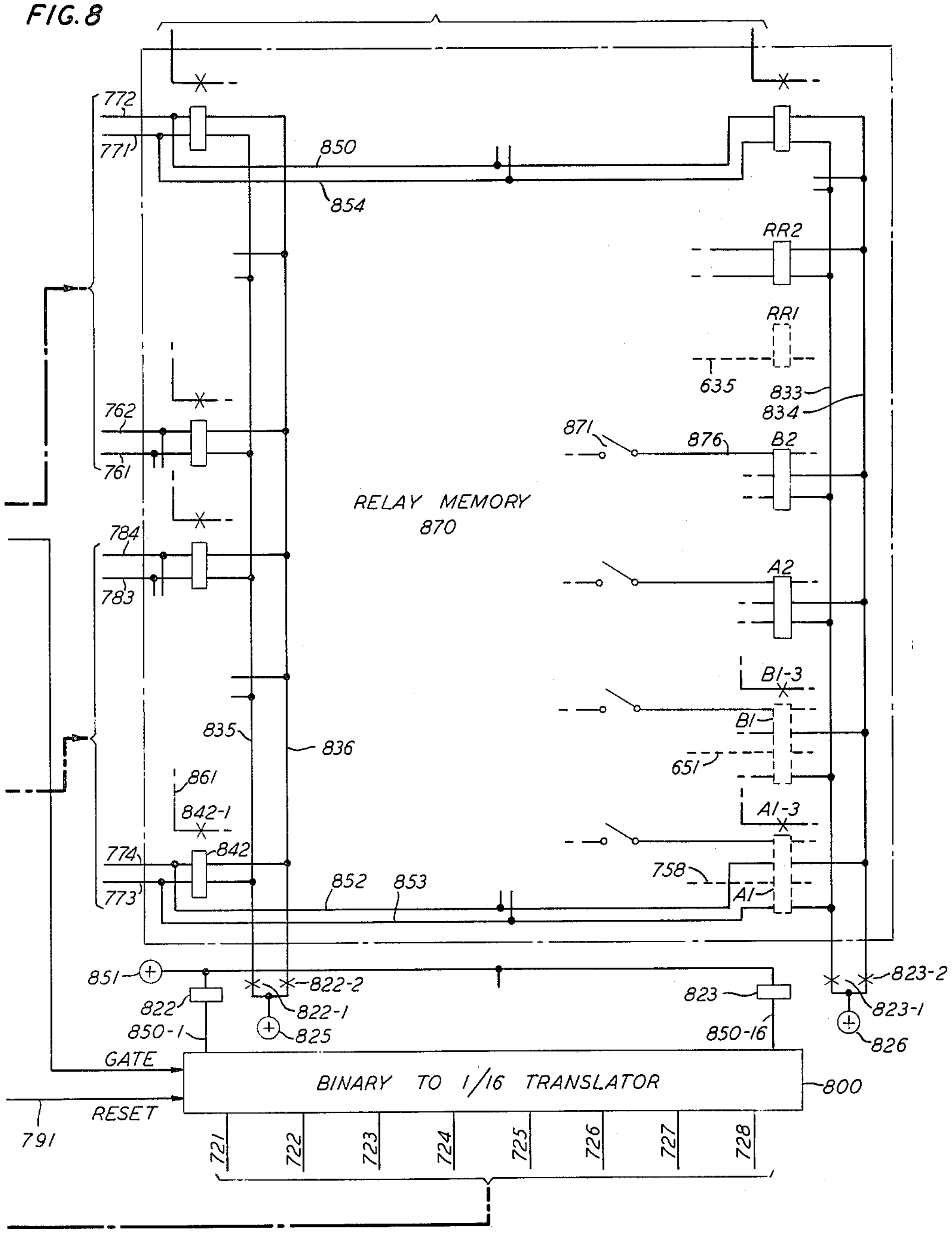

Relay 750 in addition to operating contacts 750–1 closes contacts 750–3 in FIG. 6. The closing of these contacts permits each start bit pulse applied to conductor 735 to advance the count of the sixteen-count counter 640. This counter is of the type wherein an output pulse is applied on conductor 639 after sixteen input pulses have been counted. In the event that another error has not been received along channel A1, this output is applied via conductors 639 and 661 to the reset terminal of flip-flop 740. Contacts 750–2 close in response to the operation of relay 750 and consequently this pulse resets flip-flop 740 and relay 750 deenergizes. Transmission ensues in the normal manner when the equivalent RR1 relay in transmitter 1 releases. It is no longer necessary to count the number of words transmitted as the channel is functioning properly.

The output pulse on conductor 639 also resets counter 640 as shown and prepares the latter for another rescan count when it is required.

An error transmitted along channel B1 similarly causes AND gate 623 to be operated when the start bit sets stage 732 of shift register 730. The output pulse from gate 623 on conductor 624, in a manner identical to the output pulse on conductor 652 from AND gate 634, is applied through OR gate 666 and sets flip-flop 610. Again relay RR1 operates and the entire array at the other end is scanned and all words are transmitted. In a similar manner this output pulse from AND gate 623 sets flip-flop 670 which is analogous to flip-flop 740. Relay 660, analogous to relay 750 operates and contacts 660–1 close. However, relay B1 does not operate although it is now connected to the output of AND gate 623 for as with the output of AND gate 634 the pulse is of short duration. In addition, contacts 660–3 close so that counter 640 may once again count sixteen transmitted words. And because contacts 660–2 close in a manner identical to that of contacts 750–2 the reset pulse applied on conductor 639 from counter 640 travels via conductor 662 to reset flip-flop 670 if another error during the rescan does not occur.

It is seen that an error transmitted along either channel results in the setting of flip-flop 610 with the consequent operation of the rescan request relay RR1. It should be noted that the reset pulses applied by the nine-count counter 696 to conductor 604 are applied to the reset terminal of flip-flop 610 after passing through delay 605. However, it is not desired to reset this flip-flop until the information content of the entire array at the other end has been transmitted. Consequently, contacts 660–2 and 750–2 are inserted in conductor 629. If the error was transmitted along channel A1, it was seen that relay 750 remains operated until counter 640 counts sixteen input pulses. At this time relay 750 deenergizes. Thus, until sixteen words are transmitted no reset pulses can be applied to flip-flop 610 for contacts 750–2 are open. The sixteenth pulse does not reset this flip-flop for it is applied at a time before relay 750 has deenergized. The release time of relay 750 is greater than the delay time of delay 605. The flip-flop is reset, however, after the transmission of the next word, that is, upon the application of the seventeenth reset pulse by counter 696 at which time contacts 750–2 are in their normally closed position. In a similar manner, flip-flop 610 is not reset until the seventeenth reset pulse is applied and contacts 660–2 have closed if the error was originally transmitted along channel B.

It is possible that during the transmission of the sixteen words in response to a rescan request that an error is transmitted along the other one of the two channels. For example, if the error was originally transmitted along channel A1 although another error is not transmitted along this channel during the rescan and consequently channel A1 remains in the circuit, it is possible that an error is transmitted along channel B1 during the rescan originated by the error along channel A1. The first error along channel A1 causes flip-flop 740 to be set and relay 750 to be operated. Flip-flop 610 likewise sets and relay RR1 is energized. When an error arrives on channel B1 during the rescan, flip-flop 670 sets in the normal manner. However, relay 660 does not operate as it normally would were a rescan not in progress due to the previous error along channel A1. When relay 750 is operated contacts 750–4 open and consequently, although flip-flop 670 sets, relay 660 does not operate. Immediately, after the first rescan, however, when relay 750 releases, contacts 750–4 close and relay 660 operates. When relay 660 operates contacts 660–2 open and thus the seventeenth reset pulse which is applied immediately after the transmission of the next word does not reset flip-flop 610. Consequently, relay RR1 is still operated. Counter 640 counts another sixteen pulses before relay 660 releases. At this time contacts 660–2 close and flip-flop 610 resets when the next reset pulse is applied. Relay RR1 releases and upon release of the equivalent RR1 relay in receiver 2 normal operation resumes. In a similar manner if the first error transmitted is along channel B1 and another error occurs along channel A1 before the rescan is completed flip-flop 610 does not reset because contacts 750–2 are open. Flip-flop 610 does not reset until another sixteen words are transmitted, that is until the array at the transmitting end is rescanned a second time and another error is not transmitted along channel A1 during the second rescan.

It should be noted that conductor 753 connecting the "1" output of flip-flop 740 to relay 750 contains normally closed contacts B1–2 and conductor 694 connecting output "1" of flip-flop 670 to relay 660 contains normally closed contacts A1–2. Relays A1 and B1 will be shown below to be the relays controlling the removal of channels A1 and B1 respectively from the circuit, these relays operating only after the respective ones of relays 750 and 660 have been energized in response to a first error. These two relays will be shown to operate if a second error is received along the same channel during the rescan. In the event that one channel is removed due to its inoperativeness, it is not desirable that the other channel be removed as well even if it is not functioning reliably. Although erroneously transmitted words along the single remaining channel should not operate the relays in memory 870, it is still unwise to remove the second channel from the circuit for in such a case no information may be transmitted at all. For this reason contacts A1–2 and B1–2 are included in the circuit. Consider, for example, that the first error was transmitted along channel A1 and, therefore, relay 750 has operated. If a second error is transmitted along this same channel during the rescan, it will be shown below that relay A1 operates. Contacts A1–2 open and consequently even if an error is transmitted along the remaining one channel, channel B1, relay 660 cannot be operated. Since this relay must be operated before relay B1 can energize in response to a second error being transmitted along channel B1 during the rescan, relay B1 cannot operate and remove channel B1 from the circuit. Even if the first error along channel B1 is received before relay A1 has operated, it is still impossible for relay 660 to energize. When the first error along channel A1 is received, contacts 750–4 open. It has already been shown that relay 660 is not operated until after relay 750 releases even if another error is transmitted along channel B1 and flip-flop 670 sets. If channel A1 is removed from the circuit in response to relay A1 being operated upon the transmission of a second error along channel A1, it is seen that even when relay 750 releases and contacts 750–4 close, relay 660 does not set as contacts A1–2 are now open. In a similar manner, if channel B1 is the first channel removed from the circuit, relay 750 cannot operate and consequently relay A1 cannot operate and remove channel A1 from the circuit no matter how many errors and in what sequence they are transmitted along the remaining channel in the circuit, channel A1.

B. *Receiver operation in response to detection of a second error during rescan*

If another error is transmitted along channel A1 during the rescan, i.e., after relay 750 has been operated in response to the transmission of the first error along this channel, the pulse applied at the output of AND gate 634 now operates relay A1 as contacts 750–1 are closed. Relay A1 is latching and remains operated even after the pulse has terminated. In addition to opening contacts A1–2 as previously described, this relay also causes normally open contacts A1–1, A1–3, and A1–4 to close and contacts A1–5 to open.

When contacts A1–3 close, the respective scan terminal in the primary scan gate 210 in the second direction contains thereon a nonzero potential. This information is transmitted to the receiving circuit in the second direction where the equivalent A1 relay is operated. It will be shown below that the operation of this relay modifies the transmitting circuit in the direction containing the inoperative channel A1 in such a manner that the two-half words originally stored in the transmitting shift registers 410 and 420 are both outpulsed along channel B1. The half-word normally transmitted along channel B1 is first sent and is immediately followed by the half-word normally transmitted along channel A1. Relay A1 by closing contacts A1–1 modifies the receiving circuit so that these two half-words in series along channel B1 are stored in respective shift registers 730 and 720.

The first half-word from register 420 is transmitted in the normal manner along channel B1 and stored in shift register 730. When the start bit is stored in stage 732, output "1" is energized. The voltage applied to conductor 708 now causes relays 672 and 673 to operate. In the normal operation these two relays are never operated as contacts A1–1 are open. Now, however, after the first half-word is stored in register 730 these two relays operate and close contacts 672–2 and 673–2 and open contacts 672–1 and 673–1, respectively. After the first half-word is stored in shift register 730 AND gate 703 is not operated as stage 792 in shift register 720 is in the "zero" state and conductor 742 is unenergized. In the normal operation the entire receiving circuit would be reset at this point as counter 696 has counted nine shift pulses and a reset pulse is applied. However, when relay A1 is operated, contacts A1–5 open and counter 696 cannot receive the shift pulses from the demodulator. Instead, contacts A1–4 are now closed and counter 697 counts the shift pulses from demodulator B1. This counter however requires eighteen input pulses before a reset pulse is applied through OR gate 698 to conductor 604. Consequently, after the first half-word is stored in shift register 730, a reset pulse is not applied to the circuit as only nine shift pulses have been counted. After the first half-word is stored in shift register 730 and the contacts controlled by relays 672 and 673 have operated it is seen that the next half-word transmitted along channel B1 with the associated shift pulses are no longer applied to the inputs of shift register 730 as contacts 672–1 and 673–2 are open. However, the shift pulses on conductor 693 are now applied via closed contacts 672–2 and conductor 648 to the shift input of shift register 720. In a similar manner the data pulses on conductor 692 are applied via now closed contacts 673–2 and conductor 653 to the data input of shift register 720. Consequently, the second half-word is stored in this shift register. By the time the second half-word is completely stored in shift register 720, counter 697 has counted eighteen shift pulses and a reset pulse is applied to conductor 604. If the two half-words have been transmitted with no errors and flip-flops 630 and 620 are in the "zero" states, AND gate 703 is energized, translator 800 is operated, and the word is stored in memory 870. If an error has been transmitted in either half-word, one or both of the counters 620 and 630 is in the "one" state and the erroneous word is not stored in the memory 870. In either event the reset pulse on conductor 604 resets the two counters 620 and 630, the two shift registers 720 and 730, and the translator 800. Another word is now transmitted along channel B1.

As has been stated above, channel B1 cannot be removed from the circuit as now open contacts A1–2 prevent relay 660 from being operated. If errors are transmitted they are not stored in the memory as AND gate 703 does not operate but the second channel is not removed from service for this would disrupt the transmission entirely.

In a similar manner, if channel B1 is inoperative, information is transmitted only along channel A1. When the first half-word is stored in register 720, the first half-word originally stored in transmitting shift register 410 being the first half-word transmitted along channel A1 when this is the only channel in operation, relays 645 and 650 operate as contacts B–1 are now closed. The second half-word is transmitted via conductor 690, now closed contacts 650–2 and conductor 654 to the data input of shift register 730. In a similar manner the next nine shift pulses from demodulator A1 are transmitted along conductor 691, now closed contacts 645–1, and conductor 693 to the shift pulse input of shift register 730. When both half-words are stored in the respective shift registers, the particular column of relays in memory 870 is operated if no error has been sent. If an error has been transmitted translator 800 is not operated as one or both of counters 620 and 630 are in the "one" state. In either event as contacts B1–4 are now closed rather than contacts B1–5 counter 697 counts eighteen shift pulses applied by demodulator A1 to conductors 691 and 694 and resets the receiving circuit prior to the transmission of the next word along channel A1.

In the receiver circuit, counter 696 was made self-resetting. If the start bit of the half-word in channel A1 is mutilated, the receiver circuit is out of synchronism with the transmitting circuit. It has been explained, however, that the nine-count counter 696 automatically resets before the next word is transmitted along channel A1. This counter automatically resets if no shift pulses are counted for a time interval greater than the time between two shift pulses but less than the delay time of delay 532. As shown, counter 697 which operates in the second mode of operation is not self-resetting. This counter must not be made to reset automatically if no shift pulses are received for a time interval equal to the delay of delay 532. It will be shown that the two half-words in succession on either channel are separated in the second mode of operation by a time interval also determined by delay 532.

Consequently, the shift pulses are separated by this interval as well and thus were counter 697 to reset as counter 696, it would never count 18 shift pulses but would always reset after nine. If it is desired to provide automatic reset for counter 697 to insure that the transmitting and receiving circuits remain synchronized with each other, the circuit may be modified in well-known manners for achieving this result. For example, the operation of either relay A1 or B1 rather than inserting the eighteen-count counter 697 might insert a two-count counter in series with the nine-count counter 696. The nine-count counter would operate the two-count counter once for every one cycle of its own operation. A reset pulse would still be applied after eighteen pulses have been counted although counter 696 resets after every nine. Other techniques may be used for achieving the same result. No circuit is shown in detail for achieving this objective as any one of well-known methods may be used.

Before describing the operation of the transmitting circuit in response to the detection of errors by the receiving circuit, the functions of the six special relays in memory 870 should be reviewed. Relays A1 and B1 are controlled by respective pulses from gates 634 and 623 in the receiving circuit. These relays directly modify the receiving circuit in which they are included, that is, the receiving circuit of FIGS. 6–8 which receives information transmitted from left to right as shown in FIG. 1. Equivalent relays A2 and B2 are included in the receiving circuit at the other end and operate in an identical manner to relays A1 and B1. However, in addition to these four relays being controlled by various gates in their respective receiving circuits, these four relays may additionally and advantageously be operated by data transmitted along the various channels. For example, relay A1 is controlled by gate 634 and causes channel A1 to be removed from the circuit. This relay causes the transmitter in the lower half of FIG. 1 to transmit information to receiver 2 and operate the equivalent relay A1. The equivalent relay A1 in receiver 2 must be operated in response to transmitted data. It is not necessary however for relay A1 in the memory of FIG. 8 to be operated by transmitted data as this relay is operated by gate 634. Only the equivalent relay A1 in receiver 2 must be operated by the transmitted data. However, when channel A1 is reinserted back into the circuit were relay A1 in receiver 1 controlled only by gate 634 it would be necessary to release this relay at receiver 1 by means of a release pulsing circuit to be described below. As shown, however, it is possible to release even the equivalent relay A1 in receiver 2 for now this information will be transmitted from left to right in FIG. 1, and as relay A1 in receiver 1 is controlled by transmitted data as well as by circuits within this receiver, the relay may be reset even by resetting the equivalent relay A1 in receiver 2. Similar remarks apply to relay B1 in receiver 1.

Relays A2 and B2 in receiver 1 must be operated by the transmitted data as these relays modify transmitter 2 to transmit along only the one operative channel. The equivalent relays A2 and B2 in receiver 2 which operate directly in response to equivalent gates 634 and 623 when one of the channels A2 or B2 becomes inoperative need not respond to transmitted data. It is only relays A2 and B2 in receiver 1 that must respond to the data transmitted from left to right so that they may be placed in the same energization states as the equivalent relays A2 and B2 in receiver 2. However, the equivalent relays A2 and B2 in receiver 2 may for convenience sake be connected to the receiving shift registers of receiver 2 so that when the removed channel is replaced relays A2 or B2 in receiver 1 may be released so that the equivalent relays A2 and B2 may be similarly released. In this manner, it is possible to reinsert a removed A2 or B2 channel into the circuit by operating the appropriate relay in either one of the two receiving circuits.

Relay RR1 in receiver 1 is operated only by flip-flop 610. This is the relay which operates when a rescan is desired. Information pertaining to its energization is transmitted by transmitter 2 to receiver 2 where the equivalent relay RR1 is energized. The energization of the equivalent relay RR1 in the transmitting circuit initiates the recan in a manner to be shown below. When the rescan is completed as determined by counter 640 of receiver 1 relay RR1 is released. This information is also sent by transmitter 2 to receiver 2 where the equivalent relay RR1 is released and the rescan by transmitter 1 terminated. Relay RR2 in receiver 1 is controlled only by transmitted data from transmitter 1 to receiver 1 just as relay RR1 in receiver 2 is controlled only by transmitted data from transmitter 2 to receiver 2.

IV. TRANSMITTER OPERATION

A. *Operation of transmitter in response to the detection of a single error by associated receiver*

Figure 4:
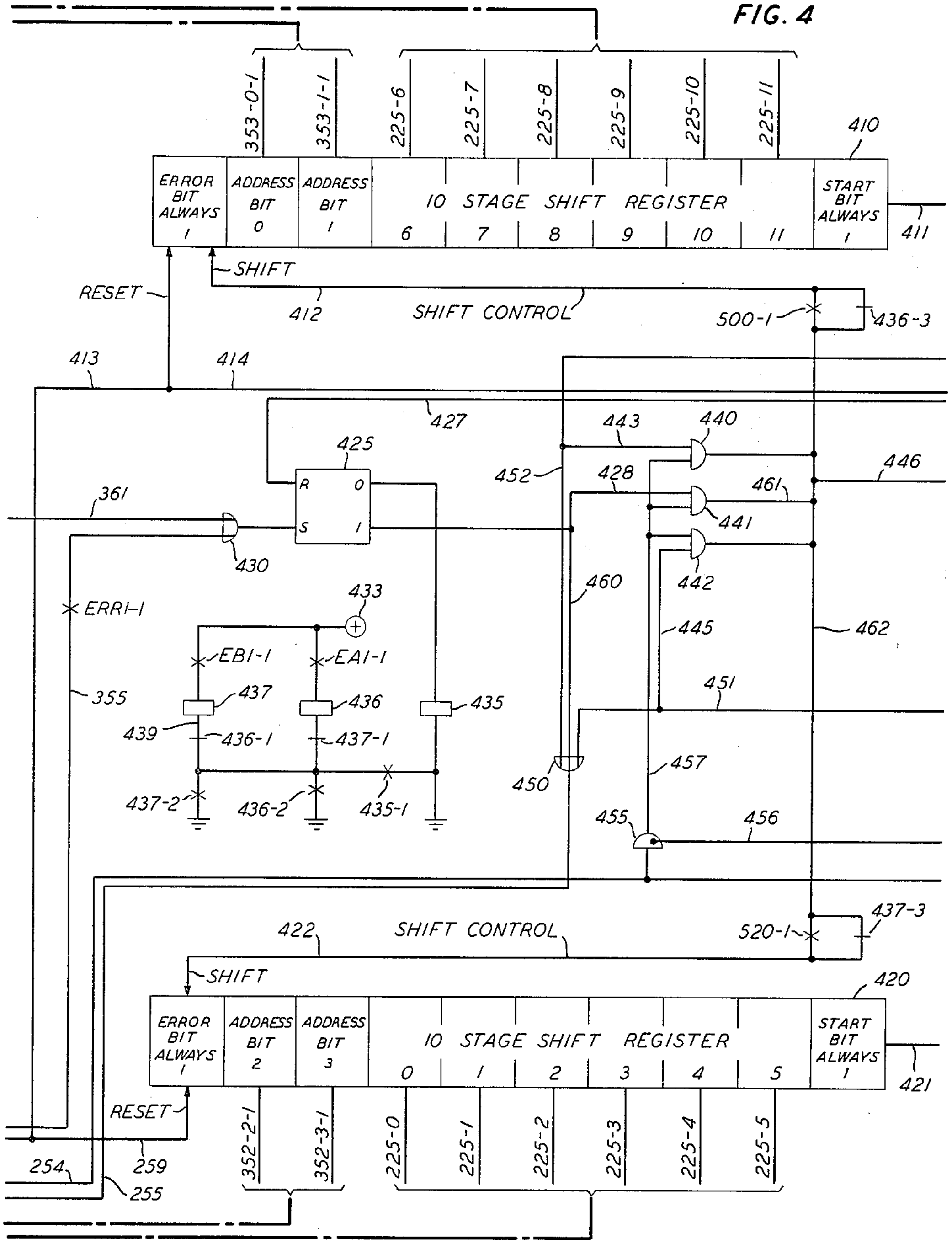
Figure 5:
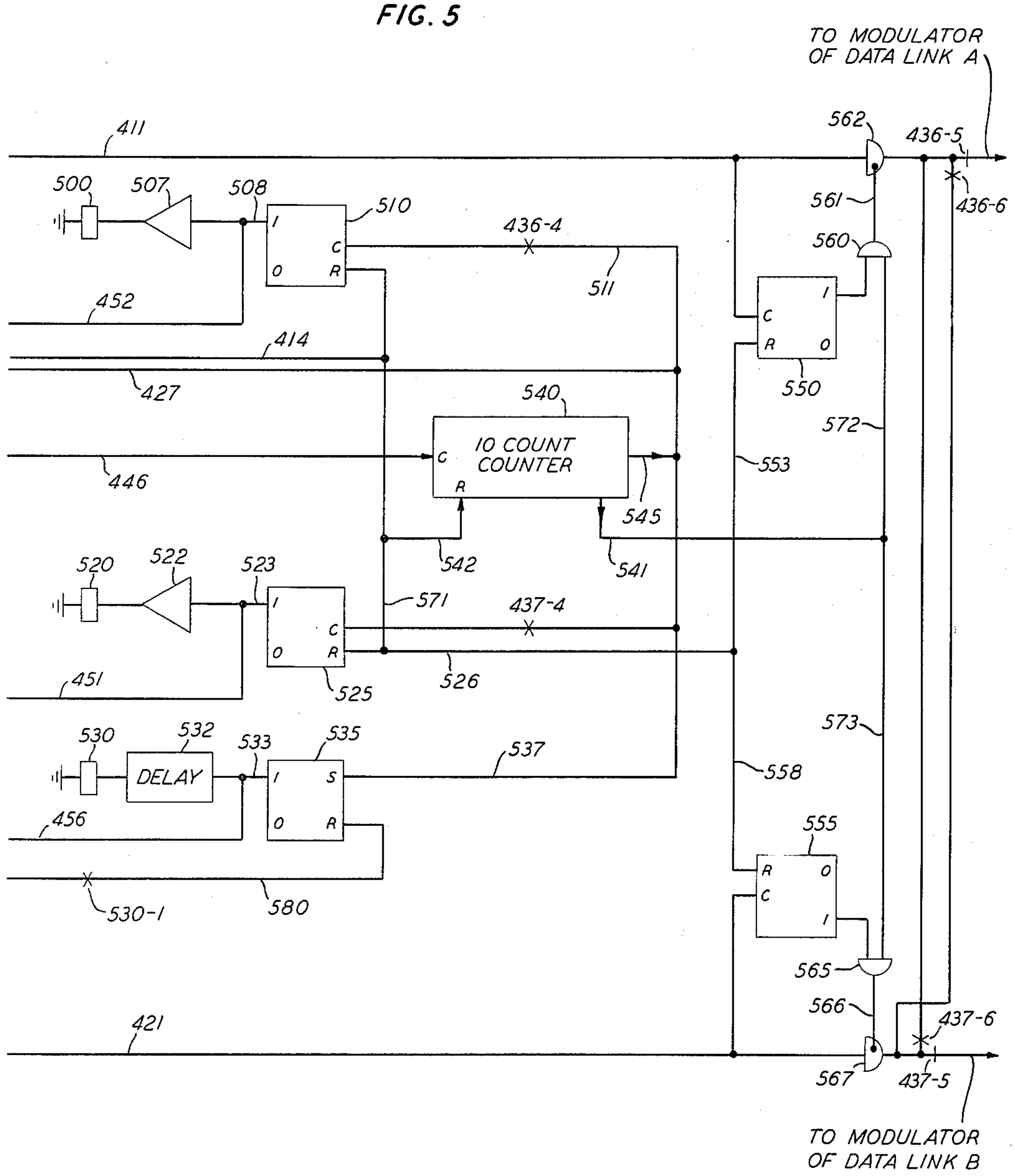

A single error transmitted along either of channels A1 or B1 has been shown to result in the operation of relay RR1 in receiver 1. This information is transmitted from transmitter 2 to receiver 2 where the equivalent RR1 relay is operated. This relay controls one pair of contacts in transmitter 1. These contacts are shown in FIG. 4 and are contained in conductor 355, the contacts being labeled ERR1–1 indicating that they are operated by the relay, not shown, at the left-end of FIG. 1 equivalent to relay RR1 in receiver 2. It has already been shown that in the normal operation the only words which are transmitted are those words different from previously stored words in the same sets of cores. It is only necessary to transmit these new words as the relays in receiver 1 are in the identical energization states as the relays in receiver 2 if no change has occurred in these relays. However, in response to the detection of an error transmitted it is possible that other errors have been transmitted as well which have not been detected and thus in order to insure that the relays in receiver 1 are brought up-to-date, the information content of the entire relay memory of receiver 2 is transmitted. It has been shown that in the normal operation the word stored in shift registers 410 and 420 is sent when a scan pulse is applied to conductor 247. This pulse causes a particular word to be stored in the core memory 320 and if this word is different from the previously stored word sense amplifier 360 applies a pulse to conductor 361 which is connected to one input of OR gate 430. This pulse sets flip-flop 425 which controls the transmission of the word stored in the shift registers.

When relay ERR1 operates the scan pulse is applied via conductor 247, conductor 249, conductor 355 and now closed contacts ERR1–1 to the second input of OR gate 430. Thus, whether or not the scanned word has changed since the last scan OR gate 430 is operated by the scan pulse applied to conductor 247 by clock 230 and flip-flop 245 sets every time a scan pulse is applied by the clock, that is for every word scanned. Thus, every word is transmitted as long as contacts ERR1–1 are closed.

When the receiving circuit has counted sixteen words indicating that the entire array information of receiver 2 has been sent and if no error occurs along the same channel which initially caused relay RR1 to be operated, relay RR1 releases and contacts ERR1–1 at the other end open. Normal operation ensues with the only words transmitted being those causing a voltage pulse to be applied to the other input of OR gate 430 connected to sense amplifier 360 by conductor 361.

B. *Transmitter operation in response to detection of a second error on the same channel*

In response to channel A1 becoming inoperative, relay A1 in receiver 1 operates. This causes equivalent relay EA1 in receiver 2, not shown, to be operated. Similar remarks apply to channel B1, relay B1 and relay EB1. Relay EA1 controls a single pair of contacts EA1–1 in the circuit of transmitter 1. These normally open contacts when closed modify the transmitting circuit in such a manner that both half-words are transmitted in succession along channel B1. In a similar manner the operation of relay EB1 controls the single pair of contacts EB1–1 which modifies the transmitting circuit in such a manner that the two half-words are transmitted in succession along channel A1. When both half-words are transmitted along channel A1 the half-word normally sent over this channel precedes the other half-word. When transmitting only along channel B1, the half-word normally transmitted along this channel precedes that normally transmitted over channel A1. This is necessary for it has been seen that the receiver circuit directs the first half-word received along the remaining single operative channel to the receiving shift register normally associated with that channel while the second half-word is directed to the other shift register.

The operation of relay EA1 in receiver 2 causes relay 436 to be operated. The operation of relay EB1 causes relay 437 to be operated. It has been seen in the receiver circuit that if a first channel is removed from service that the remaining channel must not be removed even if it becomes unreliable. In a similar manner, only one of relays 436 or 437 must be operated at any one time in order that both channels not be removed from service. Although the receiving circuit provides means for preventing the simultaneous removal of both channels, namely contacts A1–2 and B1–2, the transmitting circuit is modified as well as an extra safety precaution. When contacts EA1 close, relay 436 operates and the transmitting circuit transmits only along channel B1. The operation of relay 436 prevents relay 437 from operating even if contacts EB1–1 somehow close as a result of a mechanical failure or extraneous signal. Similarly when contacts EB1–1 close and relay 437 operates relay 436 is prevented from becoming energized even if contacts EA1–1 somehow close. A relay 435 is provided to prevent the operation of either relay 436 or 437 during the transmission of a word. While a word is being transmitted, with one-half of it on each channel, it is not desired to remove either channel. For this reason relay 435 controls relays 436 and 437 to remove an inoperative channel only while a word is not being transmitted.

Referring to FIG. 4 in the normal condition neither of relays 436 or 437 is operated. When flip-flop 425 is set and a word is being transmitted, output "0" is grounded. Consequently there is no current through the coil of relay 435 and this relay does not operate. Only when the flip-flop is reset and scanning rather than transmission is taking place does relay 435 operate and close normally open contacts 435–1. With these contacts closed it is seen that the operation of either pair of contacts EA1–1 or EB1–1 causes current to flow through the coil of a respective one of relays 436 and 437. For example, if contacts EB1–1 close, current flows from source 433, through contacts EB1–1, the coil of relay 437, conductor 439, contacts 436–1 and contacts 435–1 to ground. When relay 437 operates contacts 437–1 open. This prevents relay 436 from operating even if contacts EA1–1 somehow close. In addition, relay 437 causes contacts 437–2 to close so that when relay 435 is deenergized when flip-flop 425 is set relay 437 remains operated by the current flowing from source 433, through contacts EB1–1, the relay coil, conductor 439 and contacts 437–2 to ground.

In a similar manner, if contacts EA1–1 close, relay 436 energizes when flip-flop 425 is in the reset state. At this time the "0" output is energized, relay 435 operates and contacts 435–1 close. Current flows from source 433 through contacts EA1–1, contacts 437–1 and contacts 435–1 to ground. The operation of relay 436 closes contacts 436–2 so that the relay will remain operated even when relay 435 deenergizes. Relay 436 also controls contacts 436–1 so that even if contacts EB1–1 somehow close, no current can flow through the coil of relay 437 and this relay is inhibited from operating.

The operation of the transmitting circuit in the second mode will be described by way of example. Assume that relay A1 in receiver 1 has operated due to the inoperativeness of channel A1. The equivalent relay EA1 in receiver 2 operates and closes contacts EA1–1 when flip-flop 425 is next in the reset state. The operation of relay 436 immediately disconnects the transmitter circuit from modulator A1 as contacts 436–5 open. Instead, it is seen that any pulses outpulsed from shift register 410 on conductor 411 are transmitted via now closed contacts 436–6 to the modulator of data link B1.

The next word to be transmitted is stored in the normal fashion in shift registers 410 and 420. Flip-flop 425 sets and the voltage on conductor 460 causes OR gate 450 to inhibit the application of further scan, reset, S0 and S1 pulses. Clock pulses are transmitted through gate 455 and AND gate 441 in the normal manner. These clock pulses in the normal operation are applied to the two shift controls of the two shift registers. However, contacts 436–3 are now open and these shift pulses are no longer applied to the shift control lead 412 of shift register 410. They are applied only through contacts 437–3 to shift control lead 422 of shift register 420. Thus, shift register 420 outpulses its information content in the normal manner to the modulator of data link B1. When the half-word in register 420 has been transmitted, a pulse is applied on conductor 545 of the ten-count counter 540. In the normal operation this pulse travels along conductor 427 and resets flip-flop 425. The inhibit signal is normally removed and another word transmitted after flip-flop 535 resets. With channel A1 out of operation, however, and with relay 436 operated and contacts 436–4 closed, the reset pulse on conductor 545 is applied through conductor 511 to counter 510 and sets this flip-flop. Output "1" is energized and an inhibit signal is applied via conductor 452 and OR gate 450 to the inhibit terminal of clock 230. Thus, although flip-flop 425 resets, further scanning does not take place.

In the normal operation the output pulse on conductor 545 is also applied through conductor 537 to set flip-flop 535. It has been shown that flip-flop 535, delay 532, and relay 530 inhibit the gate 455 from transmitting clock pulses in order that the relays in the memory 870 of the receiving circuit have sufficient time to set before another word is transmitted. With channel A1 out of operation, these relays do not set until the second half-word is transmitted. However, a delay is still required in order that either one of the two sets of relays 672 and 673 or 645 and 650 have sufficient time to operate and close their respective contacts in order that the other one of the two shift registers be connected to the operative channel. Thus, for the mode of operation with channel A1 inoperative, this delay is also required. Flip-flop 535 sets and an inhibit signal is placed on gate 455. After a sufficient delay introduced by delay 532, relay 530 operates. A clock pulse is applied along conductor 580 through closed contacts 530–1 and resets flip-flop 535. At this point further clock pulses are transmitted through gate 455 to conductor 457.

AND gate 441, however, no long passes these clock pulses as conductor 428 is now connected to the deenergized output "1" of the reset flip-flop 425. However, counter 510 has been set by the output pulse on conductor 545. Output "1" is energized and operates relay 500 through conductor 508 and amplifier 507. Relay 500 in turn closes contacts 500–1. AND gate 440 now passes the clock pulse as conductor 443 is energized. The clock pulses are thus transmitted through AND gate 440. These clock pulses are now transmitted through contacts 500–1 to the shift control lead of shift register 410. The clock pulses are also transmitted through closed contacts 437–3 to shift control lead 422. However, shift register 420 no longer contains any information, all stages now being in the "zero" state as this shift register has already outpulsed its information. Consequently, the only shift register operating is register 410 which outpulses its data on conductor 411. The data from register 410 travels through gate 562 and contacts 436–6 to the modulator of data link B1.

Counter 540 again applies a second pulse to conductor 545 after shift register 410 has outpulsed its information. This pulse is applied to counter 510. While the pulse applied after the first half-word was transmitted set this counter in the "one" state, the second pulse applied after the second half-word is transmitted resets it. Output "1" is no longer energized and consequently OR gate 450 is no longer operated. The clock is no longer inhibited and further scanning takes place. In addition, relay 500 releases and contacts 500–1 open. The transmitting circuit is now in condition once again for the transmission of the next word requiring such along the remaining operative channel B1. The transmission takes place after relay 530 operates in the normal manner after the delay introduced by delay 532.

In a similar manner, when channel B1 becomes inoperative relay 437 operates. Both half-words are now transmitted only along channel A1. The first half-word transmitted is only that stored in register 410 as the first group of clock shift pulses is now applied only to shift register 410 as contacts 437–3 are now open. After the first half-word is transmitted, counter 525 sets. Inhibit voltage is applied on conductor 451 and again OR gate 450 operates inhibiting further scanning pulses from being applied. Relay 520 likewise operates and closes contacts 520–1. AND gate 442 is operated as conductor 445 is now energized by output "1" of counter 525. The clock pulses pass through AND gate 442, conductor 462 and contacts 520–1 to the shift control lead 422 of shift register 420. The information in this shift register is outpulsed along conductor 421 through gate 567 and closed contacts 437–6 to the modulator of data link A1. The second output pulse from counter 540 resets counter 525, relay 520 deenergizes, the inhibit voltage from OR gate 450 is removed and scanning resumes once again with those words requiring transmission being sent only along the remaining operative channel A1.

V. REINSERTION OF REMOVED CHANNEL INTO THE SYSTEM

All the relays of memory 870 are latching. A "one" bit energizes a relay which then locks and remains energized even after the termination of the pulse. A "zero" pulse deenergizes the relay. In order to release one of the four special relays A1, B1, A2, and B2 when the inoperative channel is replaced, a special pulsing circuit must be provided for applying a deenergizing pulse. In relay memory 870 a conductor and a manually operated key are shown symbolically coupled to each of these four special relays. When any key is operated and the associated circuit completed, pulsing equipment, not shown in the drawing, applies a deenergizing pulse to the respective relay. For example, when key 871 is operated a pulse is applied on conductor 876 which resets relay B2.

It has been explained that to reinsert a corrected channel either one of the two respective special relays may be operated. For example, if channel A1 is to be replaced in the circuit after the malfunction has been corrected either relay A1 in receiver 1 may be deenergized or the equivalent relay A1 in receiver 2 may be deenergized. Whichever relay is first operated upon causes the transmitter at the same end to transmit this information to the other end where the other relay of the pair is released.

Although a pair of relays, one in each receiver, may be released by operating a respective key at either end of the system it is preferable to restore the energized special relay at the transmitting end rather than the receiving end. For example, if channel A1 was removed from the circuit, it is preferable when reinserting this channel to operate the release key of the equivalent relay A1 in receiver 2 rather than the release key of relay A1 in receiver 1. The reason for this is that in the second mode of operation the receiver will receive not only the two half-words along the same channel but normally transmitted data as well. In the second mode of operation the first half-word after being stored in the respective shift register causes either pair of relays 672 and 673 or 645 and 650 to be operated. When one of these pairs of relays is operated, the next half-word is directed to the other shift register. However, even when the receiver is set to operate on data transmitted along only a single channel, normally transmitted data, that is, a half-word appearing in each channel simultaneously, will be stored in the two shift registers. For example, if the A1 relay has operated, after the first half-word is stored in shift register 730, relays 672 and 673 operate and direct the second half-word to shift register 720. These relays do not operate until after the first half-word is received. Thus even if relay A1 is operated, both half-words appearing in the two channels simultaneously are directed to respective shift registers. Even though relays 672 and 673 will then operate, no more information pulses are received and gate 703 operates as stages 792 and 732 are both in the "one" state and the word is stored in the memory. In order that the circuit reset prior to the transmission of the next word the pulse on conductor 702 is applied through conductor 717 to the input of delay 605.

Thus, if the equivalent A1 relay is released at the transmitting end, the next word to be transmitted is transmitted in the normal manner. Receiver 1 whose A1 relay is still operated until the necessary information is transmitted from transmitter 1 to receiver 1 can still handle the data along both channels and consequently no words are lost in the time interval between the operation of the equivalent A1 relay in receiver 2 and the A1 relay in receiver 1. However, were the A1 relay in receiver 1 to be operated, first, this receiver could only receive words transmitted in the normal mode, that is, along both channels simultaneously. The transmitter, however, would not cease transmitting both half-words along the same channel until the equivalent A1 relay in receiver 2 is operated. Thus, the transmitter would continue to transmit both half-words along the same channel although receiver 1 is incapable of handling them as relays 672 and 673 are not operated after the first half-word is received. Consequently, all words transmitted before the relay A1 in receiver 2 finally operates are lost. For this reason it is preferable to release the equivalent relay A1 in receiver 2 rather than the A1 relay in receiver 1. Similar remarks apply to relay B1.

For the same reasons it is also preferable to release relays A2 and B2 in receiver 1 rather than receiver 2.

It should be noted that when a channel is determined to be inoperative and the respective one of the special relays in the receiving circuit operates, there is a time lag until the other one of the two special relays associated with the inoperative channel and which is located at the transmitting end operates. For example, when channel A1 becomes inoperative and relay A1 in receiver 1 energizes, receiver 1 is immediately modified for the second mode of transmission. However, transmitter 1 continues to transmit in the normal fashion until the equivalent A1 relay in receiver 2 is operated in response to the data transmitted by transmitter 2 to receiver 2. However, as has been explained when receiver 1 is set to operate in the second mode it can also accept data transmitted in the normal fashion. Consequently, although channel A1 is unreliable, if any words are transmitted without errors between the respective operating times of relay A1 in receiver 1 and the equivalent relay A1 in receiver 2, these words are still stored in memory 870.

VI. SUMMARY

It is thus seen that the data transmission system of my invention is a serial-parallel type in which the setting of a memory device by an external operation at either end automatically results in the transmission of this information to the other end. Parity checks are performed for transmission in each direction and means are included at each receiver for determining which one of the channels along which the received data was transmitted has become inoperative. In such an event the receiver circuit is automatically modified for receiving information only along the remaining operative channels, in the illustrative embodiment the remaining one channel. The transmitter at the same end with the modified receiver automatically transmits a signal to the other end for modifying the transmitting circuit at that end for transmitting data only along the remaining operative channels. The transmission system is completely automatic in that inoperative channels are removed from service without requiring any external checks or operations.

Although the invention has been described with reference to a specific embodiment, it is to be understood that this embodiment is only illustrative of the application of the principles of the invention and that various changes may be made therein without departing from the spirit and scope of the invention.

What is claimed is:

1. A data transmission system comprising a transmitting and receiving circuit, a two-channel transmission path connecting said transmitting and receiving circuits, said transmitting circuit including first and second means each for transmitting one-half of the information to be transmitted along a different one of said two channels, said receiving circuit including first and second means each for receiving the information transmitted along a different one of said two channels, and means operative in response to either of said two channels becoming inoperative for controlling said first and second transmitting means to both transmit alternately along the other one of said two channels and for controlling said first and second receiving means to alternately receive the information transmitted along said other channel.

2. A two-direction data transmission system comprising a first transmitting circuit and a first receiving circuit for operating in a first direction, a second transmitting circuit and a second receiving circuit for operating in a second direction, a first two-channel transmission path connecting said first transmitting and receiving circuits, a second two-channel transmission path connecting said second transmitting and receiving circuits, said first and second transmitting circuits each including first and second means each for transmitting one-half of the information to be transmitted along a different one of the two associated channels, said first and second receiving circuits each including first and second means each for receiving the information transmitted along a different one of the two associated channels, and means operative in response to either of said two channels in either of said transmission paths becoming inoperative for controlling said associated first and second transmitting means to both transmit alternately along the other one of said two channels and for controlling said associated first and second receiving means to alternately receive the information transmitted along said other channel.

3. A two-direction data transmission system in accordance with claim 2 wherein said controlling means includes detecting means in each of said receiving circuits for detecting the inoperativeness of either of the two associated channels, each of said detecting means directly controlling the associated first and second receiving means to alternately receive the information transmitted along said other channel, means responsive to the operation of each of said detecting means for transmitting a signal in the other direction, and means in said other receiving circuit responsive to said signal for governing said first and second transmitting means to both transmit alternately along the other one of said two channels.

4. A two-direction data transmission system in accordance with claim 3 further including means in each of said receiving circuits for delaying said associated first and second receiving means from alternately receiving the information transmitted along said other channel until said first and second transmitting means both transmit alternately along said other channel.

5. A two-direction data transmission system comprising a first transmitting circuit and a first receiving circuit for operating in a first direction, a second transmitting circuit and a second receiving circuit for operating in a second direction, a first multichannel transmission path connecting said first transmitting and receiving circuits, a second multichannel transmission path connecting said second transmitting and receiving circuits, said first and second transmitting circuits each including a plurality of means for transmitting part of the information to be transmitted along a different one of the associated channels, said first and second receiving circuits each including a plurality of means each for receiving that part of the information transmitted along a different one of said associated channels, and means operative in response to any of said channels in either of said transmission paths becoming inoperative for controlling said associated plurality of transmitting means to all transmit only along the others of said channels and for controlling said associated plurality of receiving means to all receive their respective parts of the information transmitted only from said other channels.

6. A two-direction data transmission system in accordance with claim 5 wherein said controlling means includes means in each of said receiving circuits for detecting the inoperativeness of any of said associated channels, said detecting means directly controlling the associated plurality of receiving means to receive the information transmitted only from said other channels, means responsive to each of said detecting means for transmitting a signal in the other direction, and means in said other receiving circuit responsive to said signal for controlling said plurality of transmitting means to all transmit only along the others of said channels.

7. A two-direction data transmission system in accordance with claim 6 further including means in each of said receiving circuits for delaying said plurality of receiving means from receiving the information transmitted from only said other channels until said plurality of transmitting means all transmit only along said others of said channels.

8. In a two-direction data transmission system a transmitting and receiving circuit for operating together in each of said directions, a two-channel transmission path connecting each pair of said transmitting and receiving circuits, each of said channels carrying one-half of the data in each of said directions, means in each of said receiving circuits for detecting the inoperativeness of either of said channels in the respective direction, and means in each of said receiving circuits responsive to the respective detecting means for controlling said receiving circuit and for transmitting a signal in the other direction for controlling the respective transmitting circuit both to operate only with the operative one of said two channels in the direction having said inoperative channel.

9. A two-direction data transmission system in accordance with claim 8 wherein each of said detecting means includes means for detecting a first error transmitted in either of the respective two channels and means for detecting a second error along the same channel occurring thereafter during the transmission of a predetermined quantity of data for determining that said channel is inoperative.

10. In a data transmission system a transmitting and receiving circuit, a multichannel transmission path connecting said transmitting and receiving circuits, each of said channels carrying part of each data word transmitted, means in said receiving circuit for detecting the inoperativeness of any of said channels, and means in said receiving circuit responsive to said detecting means for controlling said receiving circuit and for sending a signal to said transmitting circuit for controlling said transmitting circuit both to operate only with the remaining operative ones of said channels.

11. A two-direction data transmission system comprising first transmitting and receiving circuits connected by a first transmission path for respectively transmitting and receiving data in a first direction, second transmitting and receiving circuits connected by a second transmission path for respectively transmitting and receiving data in a second direction, each of said first and second transmission paths having two channels, each of said first and second transmitting circuits including first and second means each for transmitting half of the data to be transmitted along a different one of the connected two channels, each of said receiving circuits including first and second means each for receiving the data transmitted along a different one of the connected two channels, an error detecting circuit connected to said first and second means in each of said receiving circuits, and means responsive to the detection of a predetermined number of errors transmitted in either of said channels in either of said directions for modifying the respective receiving circuit and for controlling the transmitting circuit operating in the other direction to transmit a coded signal to the receiving circuit operating in the other direction, each of said receiving circuits including means for modifying the transmitting circuit in the direction in which said predetermined number of errors were sent responsive to the transmission of said coded signal, said modified transmitting and receiving circuits thereafter utilizing only said one remaining operative channel with each of said first and second transmitting means transmitting alternately along said one channel and each of said first and second receiving means alternately receiving the data transmitted.

12. A multidirection data transmission system comprising a plurality of transmitting and receiving circuits connected respectively by a plurality of transmission paths, each of said transmission paths having a plurality of channels, each of said transmitting circuits including a plurality of means each for transmitting part of the data to be transmitted along a different one of the respective connected channels, each of said receiving circuits including a plurality of means each for receiving the data transmitted along a different one of the respective connected channels, a plurality of error detecting circuits connected respectively to said plurality of receiving circuits, and means responsive to the detection of a predetermined number of errors transmitted in any one of said channels in any one of said paths for controlling the associated transmitting and receiving circuits to respectively transmit and receive all the data to be transmitted only over the other channels in said path.

13. A data transmission system comprising a transmitting circuit, a receiving circuit, said transmitting circuit including first and second shift registers, said receiving circuit including first and second shift registers, first and second transmission channels connecting respectively said first transmitting and receiving shift registers and said second transmitting and receiving shift registers, means for storing one-half of each set of data to be transmitted in each of said transmitting shift registers, means for controlling said transmitting shift registers to simultaneously transmit their respective pieces of data along said respective channels to said respective receiving shift registers, means for detecting the inoperativeness of either one of said channels, means responsive to said detecting means for controlling said first and second shift registers to alternately transmit their respective pieces of data along the other of said channels, and means responsive to said detecting means for controlling said first and second receiving shift registers for alternately receiving said pieces of data transmitted along said other channel.

14. A data transmission system comprising first and second pluralities of relays arranged in rows and columns; first and second transmitting shift registers coupled to said first plurality of relays; third and fourth transmitting shift registers coupled to said second plurality of relays; first and second receiving shift registers coupled to said second plurality of relays; third and fourth receiving shift registers coupled to said first plurality of relays; first, second, third and fourth transmission channels connecting respectively said first, second, third and fourth transmitting and receiving shift registers; first and second means for successively storing binary data in said first and second and said third and fourth transmitting shift registers representative of the energization states of said columns of relays in said respective first and second pluralities; first and second means for respectively comparing the data stored in said first and second and said third and fourth transmitting shift registers with the previously stored data representative of the same columns of relays, said first and second comparing means respectively controlling said first and second and said third and fourth transmitting shift registers to transmit the respective pieces of data stored therein along said first and second and said third and fourth channels respectively if the presently stored data is different from the previously stored data; said respective pieces of data from said first, second, third and fourth transmitting shift registers being transmitted to and stored in said respective first, second, third and fourth receiving shift registers; first and second means for respectively determining if an error has been transmitted along either of said first or second and either of said third or fourth channels; first and second means responsive respectively to said first and second determining means for setting the energization states of the relays in said second and first pluralities in accordance with the data stored in said first and second and said third and fourth receiving shift registers respectively if no error has been determined by said first and second determining means; first and second means responsive respectively to the determination of an error transmitted along either of said first or second and either of said third or fourth channels for respectively energizing first and second particular relays in said second and first pluralities respectively; means for energizing third and fourth particular relays in said first and second pluralities respectively responsive to the respective energizations of said first and second particular relays; first and second means responsive respectively to the energization of said third and fourth particular relays for respectively controlling said first and second and said third and fourth transmitting shift registers to transmit all data stored therein independent of said first and second comparing means; and first and second means responsive respectively to the correct transmission of a predetermined amount of data along the one of said first or second or the one of said third or fourth channels along which said error was transmitted for deenergizing respectively said first and third and said second and fourth particular relays.

15. A data transmission system in accordance with claim 14 further including first means responsive to said first determining means for detecting if an additional error has been transmitted along said first or second channels during the transmission of said predetermined amount of data after said error was transmitted; first means responsive to said first detecting means for controlling said first and second transmitting shift registers to alternately transmit along that one of said first and second channels along which said error and said additional error were not transmitted and for controlling said first and second receiving shift registers to alternately receive the data transmitted along said one of said first and second channels; second means responsive to said second determining means for detecting if an additional error has been transmitted along said third or fourth channels during the transmission of said predetermined amount of data after said error was transmitted; and second means responsive to said second detecting means for controlling said third and fourth transmitting shift registers to alternately transmit along that one of said third and fourth channels along which said error and said additional error were not transmitted and for controlling said third and fourth receiving shift registers to alternately receive the data transmitted along said one of said third and fourth channels.

16. A data transmission system comprising first and second transmitting shift registers each adapted to transmit a part of a data word, first and second receiving shift registers, first and second transmission paths, first switching means normally connecting said first transmitting shift register to said first transmission path and said second transmitting shift register to said second transmission path, second switching means normally connecting said first transmission path to said first receiving shift register and said second transmission path to said second receiving shift register, first means responsive to either one of said transmission paths becoming inoperative for controlling said first switching means to alternately connect said first and second transmitting shift registers to the other of said transmission paths, and second means responsive to either one of said transmission paths becoming inoperative for controlling said second switching means to alternately connect said first and second receiving shift registers to the other one of said transmission paths.

17. A data transmission system comprising a plurality of transmitters each adapted to transmit a part of a data word, a plurality of receivers, a plurality of transmission paths, first switching means normally connecting each of said transmitters to a different one of said transmission paths, second switching means normally connecting each of said transmission paths to a different one of said receivers, and means responsive to any of said transmission paths becoming inoperative for controlling said first and second switching means to successively connect all of said plurality of transmitters and all of said plurality of receivers to the remaining operative ones of said transmission paths.

18. A transmission system comprising a plurality of transmitters each adapted to transmit a part of each data word, a plurality of receivers, a plurality of transmission paths normally connecting each of said transmitters to a different one of said receivers, and means responsive to any of said transmission paths becoming inoperative for successively connecting said plurality of transmitters and said plurality of receivers to the remaining operative ones of said transmission paths.

19. A data transmission system comprising a transmitting and receiving circuit, a multichannel transmission path connecting said transmitting and receiving circuits, said transmitting circuit including a plurality of means each for transmitting part of the information to be transmitted along a different one of said channels, said receiving circuit including a plurality of means each for receiving the information transmitted along a different one of said channels, and means responsive to any of said channels becoming inoperative for controlling said plurality of transmitting means to transmit successively only along the other ones of said channels and for controlling said plurality of receiving means to successively receive the information transmitted only along the other ones of said channels.

20. A data transmission system in accordance with claim 19 further including means to prevent said successive operation of said transmitting means from initiating in the middle of the transmission of a data word.

References Cited by the Examiner

UNITED STATES PATENTS

| | | | |
|---|---|---|---|
| 2,694,140 | 11/1954 | Gilman et al. | 333—3 X |
| 2,956,124 | 10/1960 | Hagelbarger | 340—146.1 |

NEIL C. READ, *Primary Examiner.*

MALCOLM A. MORRISON, *Examiner.*

M. POKOTILOW, H. PITTS, *Assistant Examiners.*